US010179569B2

(12) United States Patent
Steward

(10) Patent No.: US 10,179,569 B2
(45) Date of Patent: Jan. 15, 2019

(54) APPARATUS AND METHOD FOR CONTROLLING A VEHICLE SYSTEM

(71) Applicant: Jaguar Land Rover Limited, Coventry, Warwickshire (GB)

(72) Inventor: Daren Steward, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 25 days.

(21) Appl. No.: 15/524,805

(22) PCT Filed: Nov. 24, 2015

(86) PCT No.: PCT/EP2015/077553
§ 371 (c)(1),
(2) Date: May 5, 2017

(87) PCT Pub. No.: WO2016/083407
PCT Pub. Date: Jun. 2, 2016

(65) Prior Publication Data
US 2018/0001871 A1 Jan. 4, 2018

(30) Foreign Application Priority Data
Nov. 25, 2014 (GB) .................. 1420928.2

(51) Int. Cl.
B60S 1/08 (2006.01)
B60Q 1/14 (2006.01)
(Continued)

(52) U.S. Cl.
CPC .......... *B60S 1/0818* (2013.01); *B60Q 1/1423* (2013.01); *B60R 16/0231* (2013.01);
(Continued)

(58) Field of Classification Search
CPC ................ B60Q 1/1423; B60Q 1/1476; B60R 16/0231; B60R 16/0315; B60S 1/08; B60S 1/0818; B60S 1/0822
See application file for complete search history.

(56) References Cited

U.S. PATENT DOCUMENTS 5,059,877 A * 10/1991 Teder .................... B60S 1/0818
15/250.001
5,412,296 A 5/1995 Chien et al.
(Continued)

FOREIGN PATENT DOCUMENTS

DE 44 17 385 A1 11/1995
GB 2 309 322 A 7/1997
(Continued)

OTHER PUBLICATIONS

Patents Act 1977: Combined Search and Examination Report under Sections 17 and 18(3), GB Application No. GB1420928.2, dated May 22, 2015, 6 pp.
(Continued)

Primary Examiner — Tyler J Lee
(74) Attorney, Agent, or Firm — Myers Bigel, P.A.

(57) ABSTRACT

The present disclosure relates to apparatus for controlling operation of a vehicle system. The apparatus includes a processor operable in an automatic mode to output a control signal to automate operation of the vehicle system. The processor is configured to receive a measurement signal from a sensor associated with the vehicle system. The processor outputs the control signal in dependence on a comparison of the measurement signal to a control function. A user override of the automated operation of the vehicle system is detected and the processor re-calibrates the control function in dependence on the detected user override. The
(Continued)

present disclosure also relates to a vehicle and to a method of controlling operation of a vehicle system.

19 Claims, 13 Drawing Sheets

(51) Int. Cl.
*B60R 16/02* (2006.01)
*B60R 16/03* (2006.01)
*B60R 16/023* (2006.01)

(52) U.S. Cl.
CPC ............ *B60R 16/0315* (2013.01); *B60S 1/08* (2013.01); *B60S 1/0822* (2013.01); *B60Q 1/1476* (2013.01)

(56) References Cited

U.S. PATENT DOCUMENTS

| | | | |
|---|---|---|---|
| 5,436,541 A | 7/1995 | Mangler et al. | |
| 5,453,676 A | 9/1995 | Agrotis et al. | |
| 5,568,027 A * | 10/1996 | Teder | B60S 1/0818 318/283 |
| 5,973,464 A * | 10/1999 | Robbins | B60S 1/0807 15/250.13 |
| 6,140,785 A | 10/2000 | Högler | |
| 6,144,906 A * | 11/2000 | Buchanan, Jr. | B60S 1/0807 307/9.1 |
| 6,420,845 B1 * | 7/2002 | Mackel | B60S 1/0818 318/443 |
| 7,095,199 B2 * | 8/2006 | Hirose | B60S 1/0818 318/2 |
| 7,504,798 B2 * | 3/2009 | Kawada | B60S 1/0803 318/443 |
| 2014/0265980 A1 * | 9/2014 | Kracker | G06K 9/00791 318/483 |

FOREIGN PATENT DOCUMENTS

| | | |
|---|---|---|
| GB | 2 431 734 A | 5/2007 |
| WO | WO 01/70538 A2 | 9/2001 |
| WO | WO 01/70538 A3 | 9/2001 |
| WO | WO 01/77763 A1 | 10/2001 |

OTHER PUBLICATIONS

Patents Act 1977: Combined Search and Examination Report under Sections 17 and 18(3), GB Application No. GB1520746.7, dated May 20, 2016, 5 pp.

International Search Report and Written Opinion of the International Searching Authority, International Application No. PCT/EP2015/077553, dated Feb. 22, 2016, 12 pp.

* cited by examiner

APPARATUS AND METHOD FOR CONTROLLING A VEHICLE SYSTEM

RELATED APPLICATIONS

This application is a 35 U.S.C. § 371 national stage application of PCT International Application No. PCT/EP2015/077553, filed on Nov. 24, 2016, which claims priority to Great Britain Patent Application No. 1420928.2, filed Nov. 25, 2014, the disclosure and content of which are incorporated by reference herein in their entireties. The above-referenced PCT International Application was published in the English language as International Publication No. WO 2016/083407 A1 on Jun. 2, 2016.

TECHNICAL FIELD

The present disclosure relates to an apparatus and method for controlling a vehicle system. In particular, but not exclusively, embodiments of the invention relate to an apparatus and method for automatically controlling components of a vehicle. Components of a vehicle which can be automatically controlled include, but are not limited to, windshield wipers, headlights and sound generating devices. Aspects of the present invention relate to an apparatus, to a vehicle and to a method of controlling a vehicle system.

BACKGROUND

It is known to provide automated windshield wipers on road vehicles, such as automotive vehicles. A rain sensor is typically disposed behind the windshield to determine when a wipe action is required. The rain sensor detects moisture due to rain and outputs a measurement signal to an electronic control unit configured to control an operating speed and/or frequency of wiper motor. The rain sensor can, for example, comprise an optical sensor to detect optical reflectance and determine if a wipe action is required. The calibration of the rain sensor requires investment of engineering resources and may still provide unsatisfactory operation in certain scenarios. This problem can be compounded by varying usage of the windshield wipers by different users.

It is known from U.S. Pat. No. 5,453,676 to implement neural network to allow a user to train a control unit for an automated windshield wiper. The user selects a training mode and weighting factors relied on by the neural network are adjusted so that the output of the neural network matches the operating speed selected by the user.

Furthermore, it is known to provide road vehicles with automatic dipping headlights which transition from a full beam mode to a dipped mode (and vice versa) when an oncoming vehicle is detected. The oncoming vehicle can, for example, be detected using one or more onboard sensor, such as an optical sensor and/or a radar sensor. The onboard sensor outputs a measurement signal to an electronic control unit adapted to control operation of the headlights. Again, the electronic control unit requires calibration and may be susceptible to varying usage patterns by different users in certain operating conditions.

Furthermore, it is known to provide road vehicles with automatic sound volume adjustment for sound generating devices, such as an in-car entertainment system, when an increase in background noise is detected. The increase in background noise can, for example, be detected using one or more onboard sensor, such as an audio transducer. The onboard sensor outputs a measurement signal to an electronic control unit adapted to control operation of the sound generating device. Again, the electronic control unit requires calibration and may be susceptible to varying usage patterns by different users in certain operating conditions.

At least in certain embodiments, the present invention sets out to overcome or ameliorate at least some of the problems associated with prior art control systems.

SUMMARY OF THE INVENTION

According to aspects of the present invention there is provided an apparatus, a method of controlling a vehicle system and a vehicle as claimed in the appended claims.

According to a further aspect of the present invention there is provided apparatus for controlling operation of a vehicle system, the apparatus comprising a processor operable in an automatic mode to output a control signal to automate operation of the vehicle system; wherein the processor is configured to:
  receive a measurement signal from a sensor associated with the vehicle system;
  output the control signal in dependence on a comparison of the measurement signal to a control function;
  detect a user override of the automated operation of the vehicle system; and
  re-calibrate the control function in dependence on the detected user override of the vehicle system. The control function can be re-calibrated in dependence on user operation of the vehicle system. The user operation of the vehicle system is monitored by the processor to identify a user override. Thus, the processor can identify when the user intervenes to override the automated operation of the vehicle system. By correlating the measurement signal from the sensor when the user override is detected, the processor can re-calibrate the control function to reflect user preferences.

The re-calibration of the control function can be performed by applying a regression technique. The regression technique can correlate data from a plurality of user overrides to the contemporaneous measurement signal output by the sensor. Each user override can generate a data point for use in the regression technique. The regression technique can be a logistic regression technique or similar. A mean value for triggering a user override can be determined based on statistical analysis. Inferential statistics can be used to determine a confidence level for the determined mean value. It will be appreciated that the confidence level increases with the number of data points available. The control function can be re-calibrated progressively towards the mean value.

The processor can be configured to monitor user operation of the vehicle system following output of the control signal, for example during a predetermined time period following output of the control signal. The predetermined time period can, for example, be measured from the activation or deactivation of the vehicle system. The predetermined time period can be one of the following set: 1 second, 2 seconds, 3 seconds, 5 seconds or 10 seconds.

The control function can comprise an activation threshold and the control signal can be an activation signal configured to activate the vehicle system. The processor can be configured to output the control signal when the measurement signal is greater than or equal to the activation threshold. The processor can be configured to re-calibrate the activation threshold by increasing the activation threshold when the user override comprises deactivating the vehicle system following output of the activation signal. The processor can be configured to detect a user-generated request signal to deactivate the vehicle system within a predetermined time period following output of the activation signal. The processor can be configured to re-calibrate the control function by reducing the activation threshold when the user override comprises activating the vehicle system. The processor can be configured to detect a user-generated request signal to activate the vehicle system. Thus, the activation threshold can be reduced when the processor determines that the user has intervened to activate the vehicle system without an activation signal having been output. The activation threshold can be re-calibrated progressively towards a mean activation threshold value.

The control function can comprise a deactivation threshold and the control signal can be a deactivation signal configured to deactivate the vehicle system. The processor can be configured to re-calibrate the deactivation threshold by decreasing the deactivation threshold when the user override comprises re-activating the vehicle system. The processor can be configured to detect a user-generated request signal to activate the vehicle system within a predetermined time period following output of the deactivation signal. The processor can be configured to re-calibrate the deactivation threshold by increasing the deactivation threshold when the monitoring determines that the vehicle system has been deactivated by the user. The processor can be configured to detect a user-generated request signal to deactivate the vehicle system. Thus, the deactivation threshold can be increased when the processor determines that the user has intervened to deactivate the vehicle system without a deactivation signal having been output. The deactivation threshold can be re-calibrated progressively towards a mean deactivation threshold value.

A control interface can be provided for controlling operation of the vehicle system. The control interface enables direct control of the vehicle system by the user. The control interface can, for example, receive manual inputs from the user to control the vehicle system. The processor can be configured to monitor user operation of the vehicle system by monitoring operation of the control interface. The inputs to the control interface can thereby be used to monitor user operation of the vehicle system. The control interface can comprise one or more mechanical actuators or switches. Alternatively, or in addition, the control interface can comprise a touch sensor or a proximity sensor, such as a capacitive sensor. The control interface can, for example, be integrated into a touch screen or a touch pad. At least in certain embodiments, the control interface can comprise a user-operated switch to activate and deactivate the vehicle system.

The vehicle system can comprise a windshield wiper. The windshield wiper can be configured to wipe at least a section of a front windshield or a rear windshield of the vehicle. The control signal can be output to a drive means for driving the windshield wiper. The processor can be configured to provide automated control of the windshield wiper. The processor can be configured to receive the measurement signal from a rain sensor. The rain sensor can detect moisture and/or contaminants on the windshield. The rain sensor can, for example, be an optical sensor. It will be appreciated that the processor can be configured to control more than one windshield wiper on the vehicle.

The processor can be configured to receive a first request signal from a first controller to activate the windshield wiper, and a second request signal from a second controller to deactivate the windshield wiper. The first controller can be configured to activate a single wipe operation and/or to activate a continuous wipe operation. The second controller can be configured to activate a windshield washer. The user operation of the windshield wiper can be monitored based on operation of the first and second controllers. For example, the processor can monitor the output of the first and second request signals when the first and second controllers are operated by the user. The processor can be configured to record the concurrent measurement signal when the first request signal or the second request signal is received. The first and second controllers can comprise first and second switches. The first controller can be operated by a control lever. The second controller can be operated by a button.

The control function can comprise an activation threshold for activating the windshield wiper. The measurement signal from the rain sensor can be compared to the activation threshold to control activation of the windshield wiper. When the measurement signal is greater than or equal to the activation threshold, the processor can be configured to output an activation signal automatically to activate the windshield wiper. When operating in the automatic mode and the windshield wiper has been activated (for example in dependence on an activation signal output by the processor), the processor can be configured to reduce the activation threshold in dependence on the first request signal, and to increase the activation threshold in dependence on the second request signal.

The control function can comprise a deactivation threshold for deactivating the windshield wiper. The measurement signal from the rain sensor can be compared to the deactivation threshold to control deactivation of the windshield wiper. When the measurement signal is less than or equal to the deactivation threshold, the processor can be configured to output a deactivation signal automatically to deactivate the windshield wiper. When operating in the automatic mode and the windshield wiper has been deactivated (for example in dependence on a deactivation signal output by the processor), the processor can be configured to reduce the deactivation threshold in dependence on the first request signal, and to increase the deactivation threshold in dependence on the second request signal.

The vehicle system can comprise a headlight selectively operable in a full-beam mode and a dipped-beam mode. The processor can be configured automatically to activate and/or deactivate the full-beam mode in dependence on the control signal. The processor can be configured to receive the measurement signal from one or more sensors adapted to detect an oncoming vehicle. The one or more sensors can comprise an optical sensor and/or an optical camera and/or a radar system.

The processor can be configured to receive a first request signal from a first controller to activate the full-beam mode. The processor can be configured to receive a second request signal from a second controller to deactivate the full-beam mode. By deactivating the full-beam mode the processor can be configured to activate the dipped-beam mode. Therefore, the processor can be configured to receive a second request signal from a second controller to activate the dipped-beam mode. The first and second controllers can comprise respective first and second switches. The first and second controllers can, for example, be operated by a control lever, for example pivotally mounted to a steering column of the vehicle. The user operation of the headlight can be monitored based on operation of the first and second controllers.

The control function can comprise an activation threshold for activating the full-beam mode. The measurement signal from the sensor adapted to detect an oncoming vehicle can be compared to the activation threshold to control activation of the full-beam mode. When the measurement signal is greater than or equal to the activation threshold, the processor can be configured to output an activation signal automatically to activate the full-beam mode. When operating in the automatic mode and the full-beam mode has been activated (for example in dependence on an activation signal output by the processor), the processor can be configured to reduce the activation threshold in dependence on the first request signal, and to increase the activation threshold in dependence on the second request signal.

The control function can comprise a deactivation threshold for deactivating the full-beam mode. By deactivating the full-beam mode, the dipped-beam mode may be activated. The measurement signal from the sensor adapted to detect an oncoming vehicle can be compared to the deactivation threshold to control deactivation of the full-beam mode. When the measurement signal is less than or equal to the deactivation threshold, the processor can be configured to output a deactivation signal automatically to deactivate the full-beam mode. When operating in the automatic mode and the full-beam mode has been deactivated (for example in dependence on a deactivation signal output by the processor), the processor can be configured to reduce the deactivation threshold in dependence on the first request signal, and to increase the deactivation threshold in dependence on the second request signal.

The vehicle system can comprise a sound generating device selectively operable to increase a sound volume and decrease a sound volume of emitted sound. The sound may be emitted by one or more audio transducers, such as a loudspeaker, which may or may not be part of the sound generating device or may be operatively connected to the sound generating device. The processor can be configured automatically to activate and/or deactivate the increase in the sound volume in dependence on the control signal. The processor can be configured to receive the measurement signal from one or more sensors adapted to detect background noise. The one or more sensors may comprise an audio transducer, such as a microphone.

The processor can be configured to receive a first request signal from a first controller to activate the increase in the sound volume. The processor can be configured to receive a second request signal from a second controller to deactivate the increase in sound volume. By deactivating the increase in sound volume the processor may be configured to activate a decrease in sound volume. Therefore, the processor can be configured to receive a second request signal from a second controller to activate the decrease in sound volume. The first and second controllers can comprise respective first and second switches. The first and second controllers can comprise a rotary control device providing control, which may be proportional control, of an emitted sound volume upon rotation, to provide for example an increase in the sound volume on clockwise rotation and a decrease in the sound volume on anti-clockwise rotation. In other examples the first and second controllers may comprise one or more areas of a touchscreen interface. In further examples the first and second controllers may be levers or buttons. The first and second controllers can, for example, be switches, a rotary control device or a touchscreen mounted on a steering wheel of the vehicle, and/or on a user accessible surface of the sound generating device, and/or mounted on a portion of a vehicle user interface which is accessible to one or more occupants of the vehicle during use. The user operation of the sound generating device can be monitored based on operation of the first and second controllers.

The control function can comprise an activation threshold for activating the increase in the sound volume. The measurement signal from the sensor adapted to detect background noise can be compared to the activation threshold to control activation of the increase in the sound volume. When the measurement signal is greater than or equal to the activation threshold, the processor can be configured to output an activation signal automatically to activate the increase in the sound volume. When operating in the automatic mode and the increase in the sound volume has been activated (for example in dependence on an activation signal output by the processor), the processor can be configured to reduce the activation threshold in dependence on the first request signal, and to increase the activation threshold in dependence on the second request signal.

The control function can comprise a deactivation threshold for deactivating the increase in sound volume. The measurement signal from the sensor adapted to detect background noise can be compared to the deactivation threshold to control deactivation of the increase in the sound volume. When the measurement signal is less than or equal to the deactivation threshold, the processor can be configured to output a deactivation signal automatically to deactivate the increase in sound volume. When operating in the automatic mode and the increase in sound volume has been deactivated (for example in dependence on a deactivation signal output by the processor), the processor can be configured to reduce the deactivation threshold in dependence on the first request signal, and to increase the deactivation threshold in dependence on the second request signal.

The control function can comprise a defined value or a range. The output of the control signal can be dependent on whether the measurement signal is within/outside the range; or above/below the value.

The processor can be configured to re-define the control signal in dependence on the detected user response. For example, if the user increases or decreases an operating speed of the windshield wiper and/or an interval between operations of the windshield wiper, the processor can implement a corresponding change to the automated control signal to match user preference.

According to a further aspect of the present invention there is provided a vehicle comprising apparatus as described herein.

According to a still further aspect of the present invention there is provided a method of controlling operation of a vehicle system, the method comprising:
  receiving a measurement signal from a sensor associated with the vehicle system;
  outputting a control signal to automate operation of the vehicle system, the control signal being output in dependence on a comparison of the measurement signal to a control function;
  detecting a user override of the automated operation of the vehicle system; and
  re-calibrating the control function in dependence on the user override of the vehicle system.

The re-calibration of the control function can comprise applying a regression technique. The regression technique can be a logistic regression technique.

The control function can comprise an activation threshold and the control signal can be an activation signal configured to activate the vehicle system. The re-calibration of the activation threshold can comprise increasing the activation threshold when the user override comprises deactivating the vehicle system following output of the activation signal. The re-calibration of the control function can comprise reducing the activation threshold when the user override comprises activating the vehicle system.

The control function can comprise a deactivation threshold and the control signal can be a deactivation signal configured to deactivate the vehicle system. The re-calibration of the deactivation threshold can comprise decreasing the deactivation threshold when the user override comprises re-activating the vehicle system. The re-calibration of the deactivation threshold can comprise increasing the deactivation threshold when the user override comprises deactivating the vehicle system.

The user override can be detected by monitoring operation of a control interface coupled to the vehicle system. The control interface can be monitored to detect activation and/or deactivation of the vehicle system.

The vehicle system can be a windshield wiper. The method can comprise receiving the measurement signal from a rain sensor, and controlling operation of the windshield wiper in dependence on the measurement signal. A first request signal can be received from a first controller to activate the windshield wiper, and a second request signal can be received from a second controller to deactivate the windshield wiper. The control function can comprise an activation threshold for activating the windshield wiper; and, when the windshield wiper has been activated automatically, the method can comprise reducing the activation threshold in dependence on the first request signal, and increasing the activation threshold in dependence on the second request signal. The control function can comprise a deactivation threshold for deactivating the windshield wiper; and, when the windshield wiper has been deactivated automatically, the method can comprise reducing the activation threshold in dependence on the first request signal, and increasing the activation threshold in dependence on the second request signal.

The vehicle system can be a headlight operable in a full-beam mode. The method can comprise receiving the measurement signal from a sensor adapted to detect an oncoming vehicle, and controlling operation of the headlight to activate or deactivate the full-beam mode in dependence on the measurement signal. The method can comprise receiving a first request signal from a first controller to activate the full-beam mode. The method can comprise receiving a second request signal from a second controller to deactivate the full-beam mode. By deactivating the full-beam mode, a dipped-beam mode may be activated. Therefore, the method can comprise receiving a second request signal from a second controller to activate a dipped-beam mode.

The control function can comprise an activation threshold for activating the full-beam mode; and, when the full-beam mode has been activated automatically, the method can comprise reducing the activation threshold in dependence on the first request signal, and increasing the activation threshold in dependence on the second request signal. The control function can comprise a deactivation threshold for deactivating the full-beam mode; and, when the full beam mode has been deactivated automatically, the method can comprise reducing the activation threshold in dependence on the first request signal, and increasing the activation threshold in dependence on the second request signal.

The vehicle system can be a sound generating device operable to increase a sound volume. The method can comprise receiving the measurement signal from a sensor adapted to detect background noise, and controlling operation of the sound generating device to activate or deactivate the increase in the sound volume in dependence on the measurement signal. The method can comprise receiving a first request signal from a first controller to activate the increase in the sound volume. The method can comprise receiving a second request signal from a second controller to deactivate the increase in the sound volume. By deactivating the increase in the sound volume, a decrease in the sound volume may be activated. Therefore, the method can comprise receiving a second request signal from a second controller to activate a decrease in the sound volume.

The control function can comprise an activation threshold for activating the increase in the sound volume; and, when the increase in the sound volume has been activated automatically, the method can comprise reducing the activation threshold in dependence on the first request signal, and increasing the activation threshold in dependence on the second request signal. The control function can comprise a deactivation threshold for deactivating the increase in the sound volume; and, when the increase in the sound volume has been deactivated automatically, the method can comprise reducing the activation threshold in dependence on the first request signal, and increasing the activation threshold in dependence on the second request signal.

The control function can comprise a defined value or a defined range.

The method can comprise re-defining the control signal in dependence on the detected user override.

Viewed from a further aspect of the present invention there is provided a processor configured to execute a set of instructions held in system memory to perform the method described herein.

Viewed from a still further aspect of the present invention there is provided a set of instructions which, when executed by a processor, cause the processor to perform the method described herein. The instructions may be comprised in a computer program and may be provided to the apparatus via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the instructions.

The term processor is used herein to refer to one or more electronic processors. Similarly, the term system memory is used herein to refer to one or more storage devices. The processor can be a general purpose computational device configured to execute a set of software instructions to perform the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying drawings, in which.

DETAILED DESCRIPTION

Figure 1:
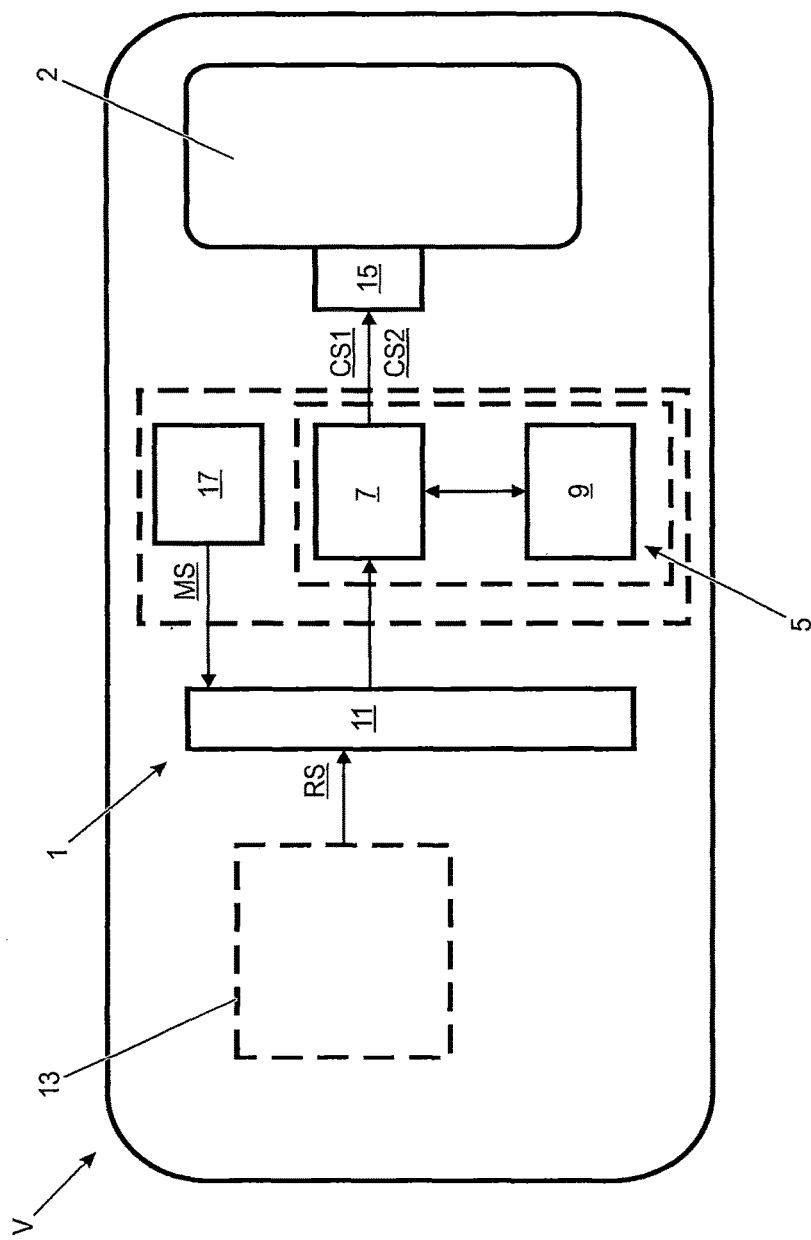
FIG. 1 shows a schematic representation of an apparatus for controlling operation of a vehicle system.

FIG. 1 shows an apparatus 1 for controlling operation of a vehicle system in accordance with an embodiment of the present invention. The apparatus 1 is installed in an automotive vehicle V to control operation of a vehicle system 2. As shown in FIG. 1, the apparatus 1 comprises a central processing unit 5. The central processing unit 5 comprises a processor 7 and system memory 9. The processor 7 is configured to execute a set of software instructions held in the system memory 9. The central processing unit 5 is connected to a communication bus 11, such as the vehicle CAN bus or FlexRay protocol, for communicating with one or more vehicle systems as described herein.

The central processing unit 5 is connected to a control interface 13 for controlling operation of the vehicle system 2. The control interface 13 is arranged to provide at least a first output. When the control interface 13 provides a first output, a corresponding request signal RS is published to the communication bus 11 for access by the processor 7. In dependence on the request signal RS, the processor 7 outputs a control signal CS to control operation of the vehicle system 2. In some embodiments the control signal CS is provided to a control unit 15 adapted to control the vehicle system 2.

A sensor 17 is operable to provide a measurement signal MS. The measurement signal MS is output by the sensor 17 to the communication bus 11 to communicate a measured parameter to the processor 7. The processor 7 is operable in an automatic mode to automate operation of the vehicle system 2 in dependence on the measurement signal MS. The automatic mode may be selected and deselected by a user through the control interface 13, or via further control means, such as a separate control, which may be a control switch. When operating in the automatic mode, the processor 7 controls the activation and deactivation of the vehicle system 2.

Specific non-limiting examples of apparatus for controlling operation of a vehicle system in accordance with an embodiment of the present invention will now be described with reference to accompanying FIGS. 2 to 13. Similar features between embodiments are provided below with similar reference numerals, but with additional reference numeral prefixes for each embodiment described.

Figure 2:
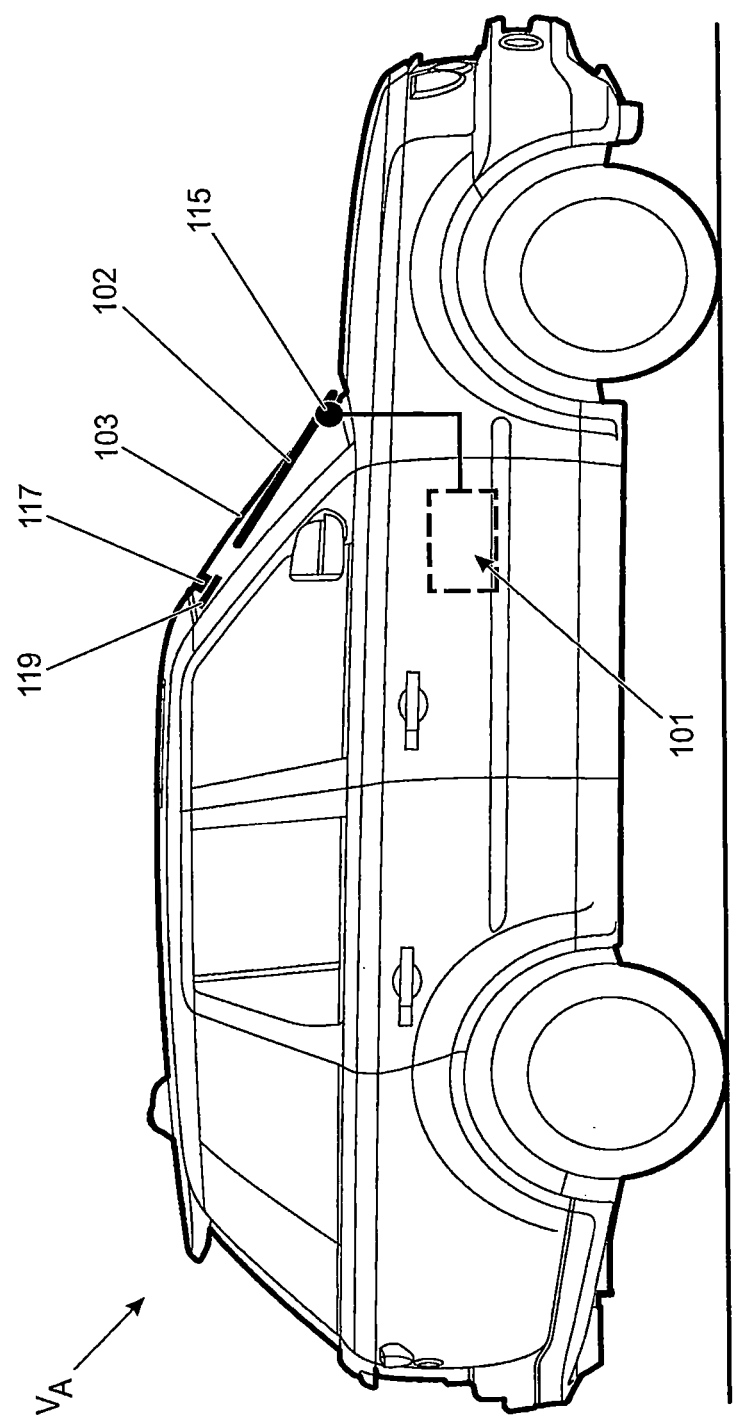
FIG. 2 shows a vehicle incorporating apparatus for controlling operation of the windshield wipers in accordance with an embodiment of the present invention.

Apparatus 101 for controlling operation of a vehicle system in accordance with an embodiment of the present invention will now be described with reference to the accompanying FIGS. 2 to 5. The apparatus 101 is installed in an automotive vehicle $V_A$ to control operation of a set of windshield wipers 102 for cleaning a windshield 103, as shown in FIG. 2. The apparatus 101 is described herein with reference to controlling the windshield wipers 102 at the front of the vehicle $V_A$, but could also control operation of a windshield wiper at the rear of the vehicle $V_A$.

Figure 3:
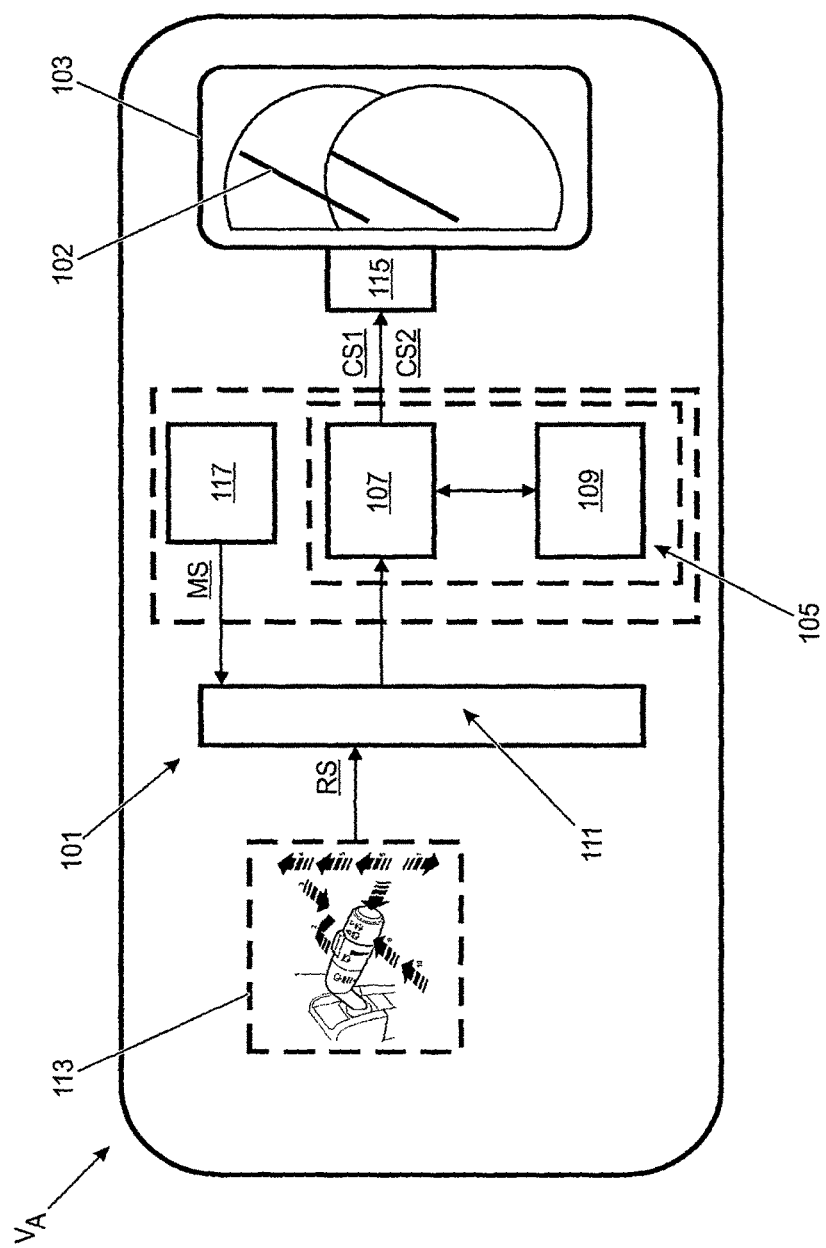
FIG. 3 shows a schematic representation of apparatus shown in FIG. 2.

As shown in FIG. 3, the apparatus 101 comprises a central processing unit 105. The central processing unit 105 comprises a processor 107 and system memory 109. The processor 107 is configured to execute a set of software instructions held in the system memory 109. The central processing unit 105 is connected to a communication bus 111, such as the vehicle CAN bus or FlexRay protocol, for communicating with one or more vehicle systems as described herein.

Figure 4:
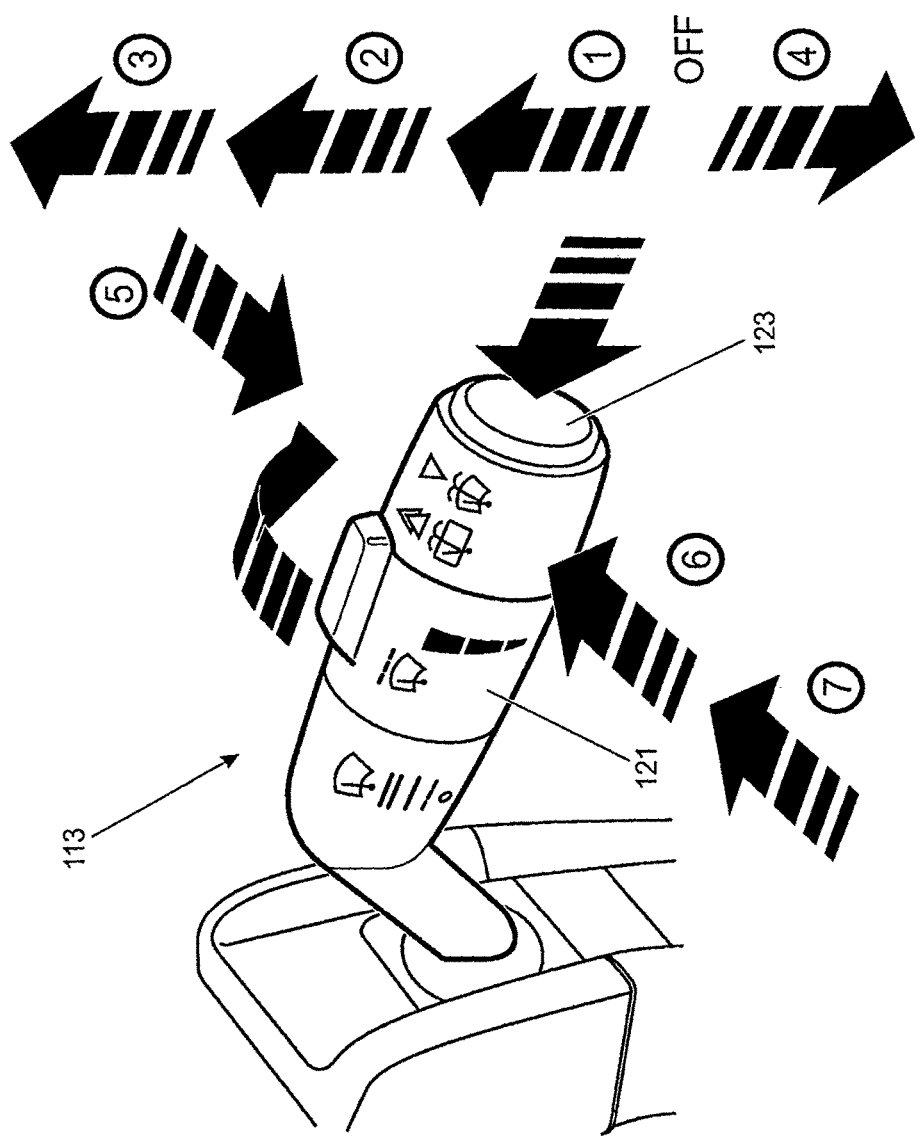
FIG. 4 illustrates operating modes of a control lever for use in conjunction with the apparatus shown in FIG. 3.

The central processing unit 105 is connected to a control interface in the form of a control lever 113 for controlling operation of the windshield wipers 102. The control lever 113 is movable from an OFF position to seven (7) operating positions to provide the following functions:

POSITION 1—Automatic operation
POSITION 2—Normal speed wipe
POSITION 3—Fast speed wipe
POSITION 4—Single (flick) wipe
POSITION 5—Wash/wipe function
POSITION 6—Rear wash/wipe function
POSITION 7—Rear wipe operation As illustrated in FIG. 4, the control lever 113 is pivoted upwardly to POSITIONS 1, 2 and 3; and pivoted downwardly to POSITION 4. When the control lever is displaced to one of the operating positions, a corresponding request signal RS is published to the communication bus 111 for access by the processor 107. In dependence on the request signal RS, the processor 107 outputs a control signal CS to control operation of a drive unit 115 adapted to drive the windshield wipers 102.

A rain sensor 117 is provided to detect varying amounts of dirt or water on the outside of the windshield 103. The rain sensor 117 in the present embodiment is an optical sensor fitted to the inside of the windshield wipers 102 in front of a rear view mirror 119. A measurement signal MS is output continuously by the rain sensor 117 to the communication bus 111 to indicate the amount of reflected light detected by the rain sensor 117. The processor 107 is operable in an automatic mode to automate operation of the windshield wipers 102 in dependence on the measurement signal MS. The automatic mode is selected when the control lever 113 is in POSITION 1. When operating in the automatic mode, the processor 107 controls the activation and deactivation of the windshield wipers 102. The processor 107 can optionally also control the operating frequency of the windshield wipers 102, for example by adjusting a time interval between wiping actions, and/or an operating speed of the windshield wipers 102. The processor 107 is configured to increase or decrease the frequency of operation of the windshield wipers 102 depending on the measurement signal MS. If the rain sensor 117 detects constant rain, the windshield wipers 102 are operated continuously at the normal (default) speed. Thus, the measurement signal MS output by the rain sensor 117 is used to implement automated control of the windshield wipers 102. The sensitivity of the rain sensor 117 can optionally be adjusted manually by rotating a rotary selector 121 disposed on the control lever 113. The processor 107 could optionally be configured to monitor the selected sensitivity of the rain sensor 117 and calibrate the activation threshold based on the user-selected sensitivity setting. Alternatively, the rotary selector 121 could be used to control operating parameters of the windshield wipers 102, such as the operating frequency and/or operating speed, which could be used by the processor 107 to control operation of the windshield wipers 102 in the automatic mode. The rotary selector 121 could be omitted in certain embodiments.

When the control lever 113 is in POSITION 2, the processor 107 is configured to control operation of the windshield wipers 102 at a normal (default) speed. The processor 107 is configured to increase the operating speed of the windshield wipers 102 when the control lever 113 is in POSITION 3. The processor 107 is configured to control the windshield wipers 102 to perform a single wipe if the control lever 113 is pivoted downwardly to POSITION 4 and released immediately. If the control lever 113 is held in POSITION 4, the windshield wipers 102 operate at the normal (default) speed until the control lever 113 is released.

The control lever 113 is also operable to control a windshield washer (not shown) which squirts a jet of water onto the exterior of the windshield 103. As shown in FIG. 4, the control lever 113 is pivoted in a rearwards direction towards the steering wheel (POSITION 5) to activate the windshield washer. The windshield wipers 102 operate in conjunction with the windshield washer for as long as the lever is held in this position (the windshield wipers 102 continue to operate to complete a further three (3) wipes after release of the control lever 113). The windshield washer is also operable by depressing a button 123 disposed at a free end of the control lever 113.

As shown in FIG. 4, the control lever 113 can be pivoted in a forwards direction away from the steering wheel to activate the rear windshield wipers (not shown) and/or a rear washer (not shown) associated with the rear windshield. When the control lever 113 is pivoted to POSITION 6, the rear washer and the rear windshield wipers operate together until the control lever 113 is released by a user, typically the driver. When the control lever 113 is pivoted to POSITION 7, the rear windshield wipers operate continuously. It will be appreciated that other control inputs can be used to control operation of the rear washer and/or rear windshield wiper.

The processor 107 is configured to automate operation of the windshield wipers 102 when the automatic mode is selected (i.e. the control lever 113 is in POSITION 1). In particular, the processor 107 is configured to control activation/deactivation of the windshield wipers 102 by comparing the measurement signal MS to a control function stored in the system memory 109. In dependence on the results of the comparison, the processor 107 outputs the control signal CS to control operation of the drive unit 115 and, therefore, operation of the windshield wipers 102. The control function can comprise an activation threshold and optionally also a deactivation threshold. When the measurement signal MS is greater than or equal to the activation threshold, the processor 107 outputs a first control signal CS1 to activate the drive unit 115. When the measurement signal MS is less than the deactivation threshold, the processor 107 outputs a second control signal CS2 to deactivate the drive unit 115. The activation threshold can be the same as, or different from the deactivation threshold.

The processor 107 is configured to re-calibrate the control function in dependence on user behaviour. In particular, the processor 107 is configured to monitor user operation of the windshield wipers 102 to determine if the automated control of the windshield wipers 102 is consistent with user-controlled operation of the windshield wipers 102. The processor 107 is configured to identify user interventions to override the automated operation of the windshield wipers 102. The request signal RS is monitored to provide predictors for use in statistical analysis of the user behaviour. Statistical analysis enables re-calibration of the control function to implement a transfer function representing a relationship between the measurement signal MS from the rain sensor 117 and operation of the wipers 102.

Considering the automated activation of the windshield wipers 102, the processor 107 is configured to determine: (a) if the windshield wipers 102 have been activated automatically when they are not required by the user (an undesired activation); and (b) if the windshield wipers 102 are in a deactivated state when they are required by the user (a desired activation). The processor 107 interprets a request by the user to perform a single wipe as an indication that a wipe was required but was not provided. The control lever 113 is used as a first controller to request activation of the windshield wipers 102. When the control lever 113 is moved to POSITION 4, a first request signal RS1 is output and interpreted by the processor 107 as an indication that activation of the windshield wipers 102 would have been appropriate. When the first request signal RS1 is received, the processor 107 stores the current measurement signal MS output by the rain sensor 117. The manual displacement of the control lever 113 to request a single wipe within a pre-determined time period causes the processor 107 to exit the automatic mode (since the control lever 113 is moved from POSITION 1 to POSITION 4), but the measurement signal MS output by the rain sensor 117 when the user deactivates the windshield wipers 102 is read by the processor 107 and the activation threshold re-calibrated accordingly. In an alternate implementation, the control lever 113 could be re-configured to return to POSITION 1, for example by a spring biasing member. Alternatively, or in addition, the user operation of the control lever 113 to activate the windshield wipers 102, for example by moving the control lever 113 to POSITION 2 or POSITION 3, can be interpreted by the processor 107 as an indication that a wipe was required but was not provided. A corresponding first request signal RS1 can be output to the processor 107 and the current measurement signal MS stored.

If the windshield wipers 102 have been activated automatically, the processor 107 interprets a request by the user to deactivate the windshield wipers 102 within a predetermined time period as an indication that activation of the windshield wipers 102 was inappropriate. In the present embodiment, the button 123 is used as a second controller to provide an indication that the activation of the windshield wipers 102 was inappropriate. When the button 123 is depressed, a second request signal RS2 is output. If the second request signal RS2 is received by the processor 107 within a predetermined time period following activation of the windshield wipers 102, the second request signal RS2 is interpreted by the processor 107 as an indication that activation of the windshield wipers 102 was not required. When the second request signal RS2 is received, the processor 107 stores the current measurement signal MS output by the rain sensor 117. Alternatively, or in addition, displacement of the control lever 113 to the OFF position could be interpreted by the processor 107 as an indication that the activation of the windshield wipers 102 was inappropriate.

The existing functions of the control lever 113 are interpreted as providing positive or negative feedback on the automated control of the windshield wipers 102. The stored measurement signals MS can subsequently be used to re-calibrate the control function to automate operation of the windshield wipers 102.

The processor 107 uses the first and second request signals RS1, RS2 as predictors for implementing a logistic regression algorithm to re-calibrate the activation threshold. In particular, the processor 107 is configured to increase the activation threshold when the windshield wipers 102 are deactivated by the user and to reduce the activation threshold when the windscreen windshield wipers 102 are activated by the user. The activation threshold can be re-calibrated progressively based on a determined mean activation threshold. Inferential statistical analysis can be used to determine a confidence interval for the mean activation threshold. The processor 107 in the present embodiment is configured to re-calibrate the activation threshold only when the automatic operation is selected (i.e. with the control lever 113 in POSITION 1). A time rule can be applied to identify a teaching action rather than a one-off event. By way of example, a new user may switch off the automated function and the time rule can be used to differentiate between this and a user-override scenario. The time rule can operate to inhibit re-calibration of the activation threshold. The time period associated with the time rule can be adjusted to provide the desired function. The processor 107 thereby re-calibrates the logistical transfer function between the measurement signal MS and the operation of the windshield wipers 102.

The operation of the processor 107 has been described herein with reference to re-calibrating the activation threshold. The processor 107 can optionally also be configured to re-calibrate a deactivation threshold. Specifically, the processor 107 can be configured to identify user interventions to the automated operation of the windshield wipers 102 to determine: (a) if the windshield wipers 102 have been deactivated when they are still required by the user (an undesired deactivation); and (b) if the windshield wipers 102 remain in an activated state when they are no longer required by the user (a desired deactivation). The processor 107 monitors the request signal RS from the control lever 113 to monitor user behaviour.

When the windshield wipers 102 have been activated by the processor 107 operating in the automatic mode, the request signal RS can be monitored to re-calibrate the deactivation threshold. Statistical analysis is used to re-calibrate the deactivation threshold to implement a transfer function which determines a relationship between the measurement signal MS from the rain sensor 117 and operation of the wipers 102. If the windshield wipers 102 are deactivated automatically and the user re-activates the windshield wipers 102 within a predetermined time period, the processor 107 determines that the deactivation of the windshield wipers 102 was inappropriate. In the present embodiment, a user request for a single wipe within the predetermined time limit is interpreted as a request to re-activate the windshield wipers 102. When the control lever 113 is moved to POSITION 4, the first request signal RS1 is output and interpreted by the processor 107 as an indication that the deactivation was inappropriate. The processor 107 reads the current measurement signal MS output by the rain sensor 117 and stores the value in the system memory 109. Alternatively, or in addition, operation of the control lever 113 to select normal (POSITION 2) or fast (POSITION 3) operation of the windshield wipers 102 can be interpreted by the processor 107 as an indication that the activation of the windshield wipers 102 was appropriate.

The button 123 is depressed to signal that operation of the windshield wipers 102 was inappropriate. When the button 123 is depressed, the second request signal RS2 is output and interpreted by the processor 107 as an indication that the continued operation of the windshield wipers 102 was inappropriate. When the second request signal RS2 is received, the processor 107 reads the current measurement signal MS output by the rain sensor 117 and stores the value in the system memory 109. Alternatively, or in addition, the deactivation of the windshield wipers 102 by the user, for example by moving the control lever 113 to the OFF position, can be interpreted by the processor 107 as an indication that the continued operation of the windshield wipers 102 was inappropriate. The second request signal RS2 can be output when the control lever 113 is moved to the OFF position. The current measurement signal MS can be stored when the processor 107 determines that the user has de-activated the windshield wipers 102. Again, it will be appreciated that the existing functions of the control lever 113 are interpreted as providing positive or negative feedback on the automated control of the windshield wipers 102.

The processor 107 uses the first and second request signals RS1, RS2 as predictors for implementing a logistic regression algorithm to re-calibrate the deactivation threshold. In particular, the processor 107 is configured to increase the deactivation threshold when the windshield wipers 102 are deactivated by the user; and to reduce the deactivation threshold when the windscreen windshield wipers 102 are re-activated by the user within a predefined time period following an automated deactivation. The deactivation threshold can be re-calibrated progressively based on a determined mean deactivation threshold. Inferential statistical analysis can be used to determine a confidence interval for the determined mean deactivation threshold. The processor 107 thereby re-calibrates the logistical transfer function established between the measurement signal MS and the operation of the windshield wipers 102.

Figure 5:
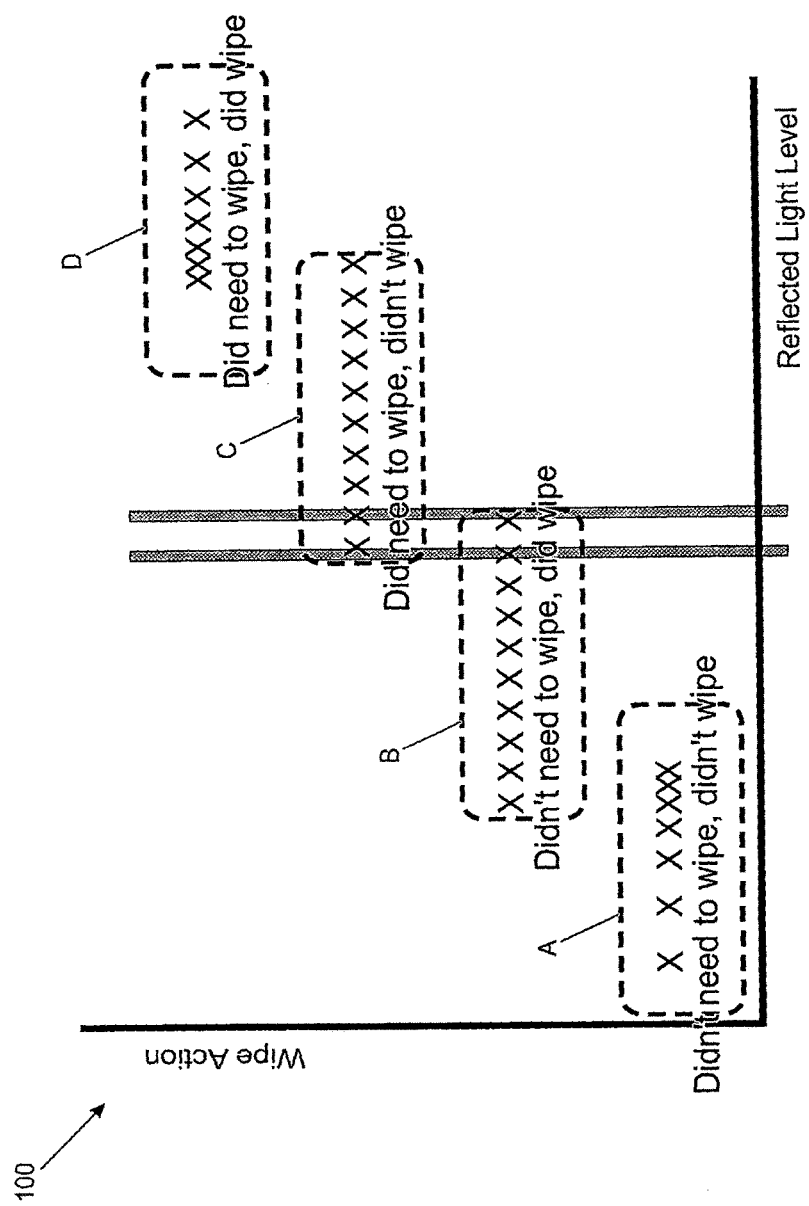
FIG. 5 shows a chart representing activation of the windshield wiper in dependence on a light level detected by a sensor.

The logistic regression technique implemented by the processor 107 is represented in FIG. 5 as a chart 100. The wipe action of the windshield wipers 102 is shown on the Y-axis and the measurement signal MS output by the rain sensor 117 is shown on the X-axis. The possible operating scenarios are represented by first, second, third and fourth regions A-D, namely:

A—Didn't need to wipe, didn't wipe
B—Didn't need to wipe, did wipe
C—Did need to wipe, didn't wipe
D—Did need to wipe, did wipe The apparatus 101 seeks to calibrate the control function such that the activation and/or deactivation of the windshield wipers 102 is controlled to perform a wiping function only when required. This target operating zone is represented by two vertical lines in FIG. 5 intersecting the overlapping portions of the second and third regions B, C corresponding to the scenarios where a wipe was performed but was not required; and a wipe was not performed but was required. As described herein, the control function is re-calibrated based on user response to the automated activation/deactivation of the windshield wipers 102. Inferential statistical analysis can be used to determine a confidence interval for the mean activation threshold and the mean deactivation threshold. The activation threshold and the deactivation threshold can be re-calibrated incrementally based on the corresponding mean activation and deactivation thresholds.

By re-calibrating the activation threshold, the processor 107 can continuously adjust operation of the windshield wipers 102 to match the preferences of a particular user. The system memory 109 can store the activation threshold and the deactivation threshold. The processor 107 can be coupled to a user identification module to enable the identity of a particular user to be determined. A control function(s) can be stored in the system memory for a plurality of users, for example as part of the seat memory position function, and the appropriate control function accessed by the processor 107 in dependence on the user identified by the user identification module.

It will be appreciated that various changes and modifications can be made to the apparatus 101 described herein without departing from the scope of the present application. The processor 107 can be configured to receive measurement signals from more than one sensor to automate operation of the vehicle system. For example, the measurement signals from different types of sensors can be used to control operation of the vehicle system.

A particular configuration of the control lever 113 for selecting the different operating modes of the windshield wipers 102 has been described herein. It will be appreciated that other configurations can be implemented without departing from the present invention. At least in certain embodiments, the control lever 113 can perform different control functions depending on whether the vehicle system is operating in a manual mode or in an automated mode. The control lever 113 can control the vehicle system directly when operating in a manual mode; and can signal a user override or intervention when operating in the automated mode. Thus, the control lever 113 provides dual functionality, at least in certain embodiments. This dual function can be used for other vehicle systems, such as the headlight control described herein.

Figure 6:
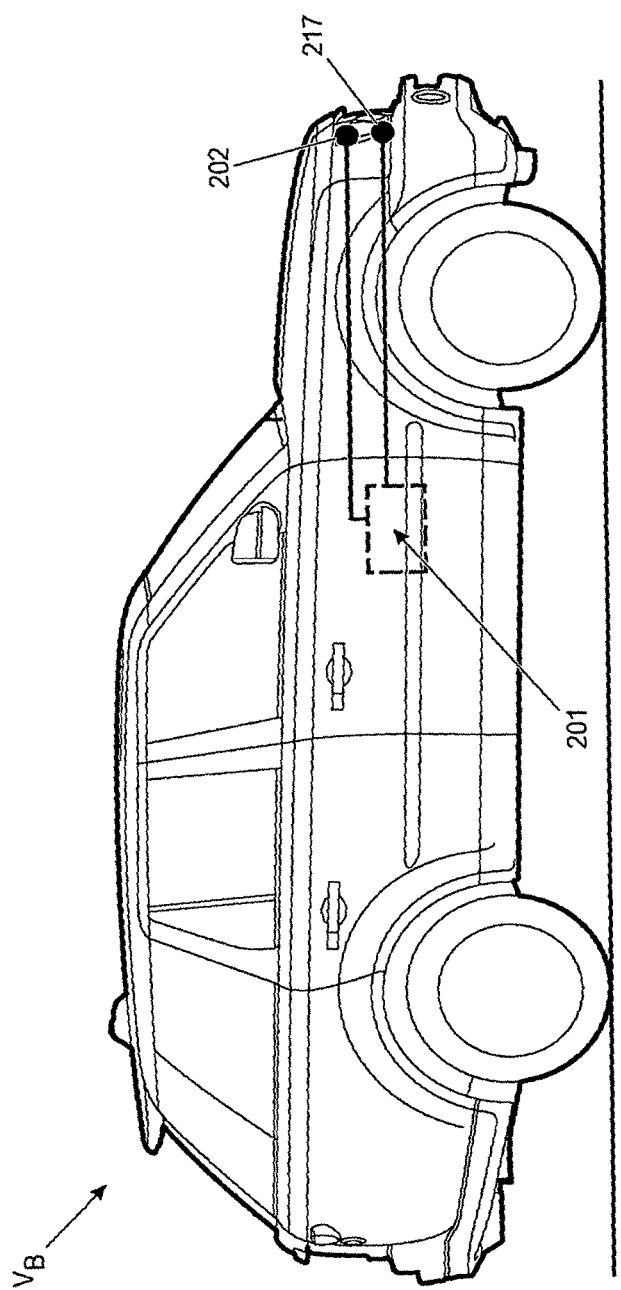
FIG. 6 shows a vehicle incorporating apparatus for controlling operation of the headlights in accordance with an embodiment of the present invention.

Apparatus 201 for controlling operation of a vehicle system in accordance with an embodiment of the present invention will now be described with reference to the accompanying FIGS. 6 to 9. The apparatus 201 is installed in an automotive vehicle $V_B$ to control operation of vehicle headlights 202, as shown in FIG. 6.

Figure 7:
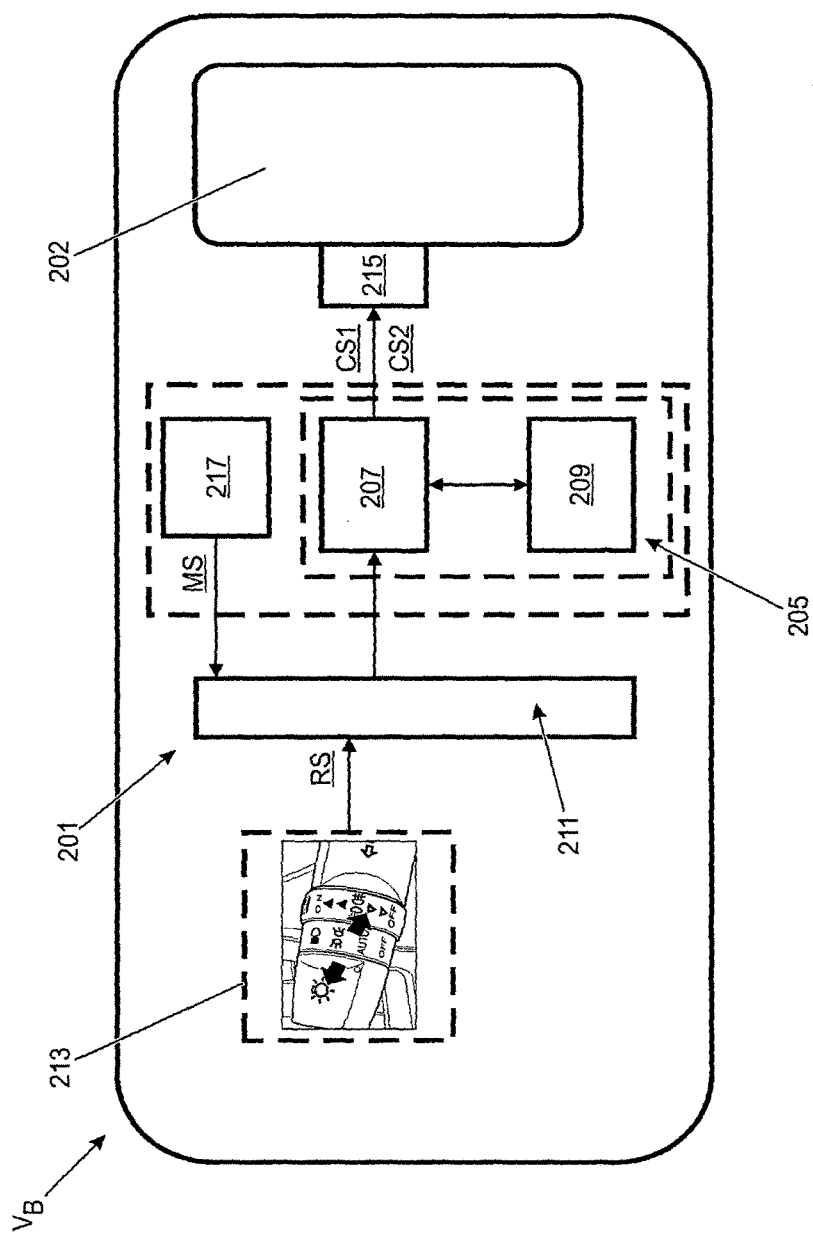
FIG. 7 shows a schematic representation of apparatus shown in FIG. 6.

As shown in FIG. 7, the apparatus 201 comprises a central processing unit 205. The central processing unit 205 comprises a processor 207 and system memory 209. The processor 207 is configured to execute a set of software instructions held in the system memory 209. The central processing unit 205 is connected to a communication bus 211, such as the vehicle CAN bus or FlexRay protocol, for communicating with one or more vehicle systems as described herein.

The central processing unit 205 is connected to a control interface in the form of a control lever 213 for controlling operation of the headlights 202, in particular for operating the dipped-beam mode and the full-beam mode of the headlights 202.

Figure 8:
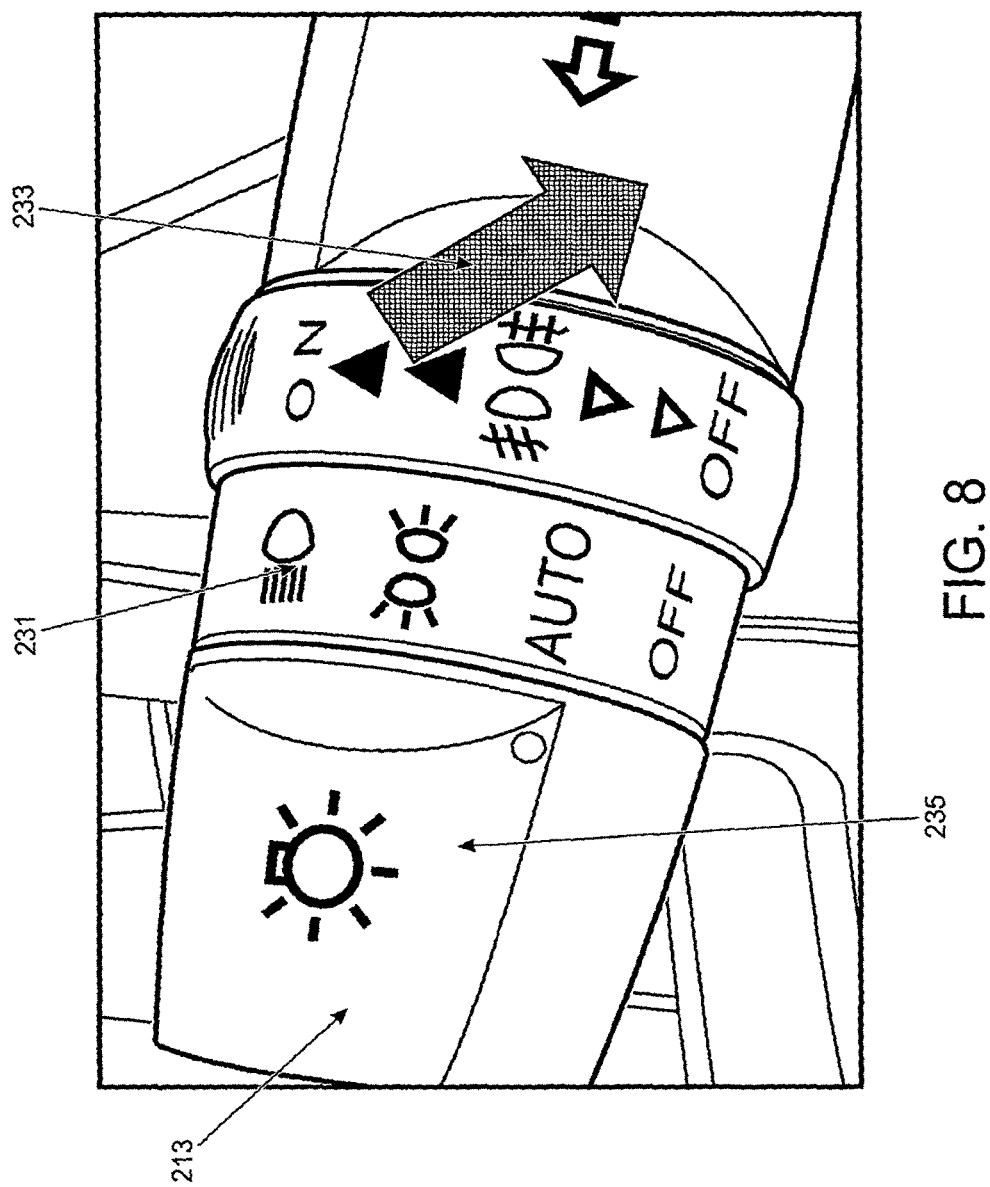
FIG. 8 illustrates a control lever for use in conjunction with the apparatus shown in FIG. 7.

As illustrated in FIG. 8, the control lever 213 is operable to provide at least two functions, the first function to operate or set a full-beam mode, and a second function to operate or set a dipped-beam mode. The full-beam mode may also be called a high-beam mode.

When the control lever 213 or a portion of the control lever 213 is displaced to one of the operating positions illustrated by arrow 233 and 231, a corresponding request signal RS is published to the communication bus 211 for access by the processor 207. In dependence on the request signal RS, the processor 207 outputs a control signal CS to control operation of a control unit 215 adapted to control the operation of the headlights 202. In other embodiments other rotary controls or switches may alternatively, or additionally, be provided for vehicle headlight 202 control. It will be understood that the operation of specific control levers 213 or portions of control levers 213 for the control of the vehicle headlights 202 may vary from vehicle to vehicle. Additional, or alternative controls may be provided on another component of the vehicle, such as the steering wheel or vehicle centre console, to provide for the control of functions of the headlights 202.

It is to be understood that embodiments of the invention require two outputs from the control lever 213, or other components of the vehicle, for the user to provide an override of the automated operation of the headlights 202, the functions of which will be described below.

A sensor 217 is provided to detect an oncoming vehicle. The sensor 217 in the present embodiment is an optical sensor fitted to the front of the vehicle 201. However, other sensors such as radar sensors could be implemented in other embodiments. A measurement signal MS is output continuously by the sensor 217 to the communication bus 211 to indicate the amount of reflected light detected by the sensor 217. The processor 207 is operable in an automatic mode to automate operation of the headlights 202 in dependence on the measurement signal MS.

The automatic mode is selected when the control lever 213 is placed in position activating automatic mode, for example by rotating rotary switch 235 to the AUTO position. When operating in the automatic mode, the processor 207 controls the activation and deactivation of the full-beam mode of the headlights 202.

The sensitivity of the sensor 217 can optionally be adjusted manually by rotating a rotary selector (not shown) disposed on the control lever 213, or elsewhere. The processor 207 could optionally be configured to monitor the selected sensitivity of the sensor 217 and calibrate the activation threshold based on the user-selected sensitivity setting. Alternatively, the rotary selector could be used to control operating parameters of the headlights 202, which could be used by the processor 207 to control operation of the headlights 202 in the automatic mode. The rotary selector could be omitted in certain embodiments.

The control lever 213 is operable to control a flash of the full-beam mode of the headlights 202. The flash of the full-beam mode of the headlights 202 operates the full-beam mode of the headlights 202 for a short time period, or for a time period defined by the length of time the user operates the control lever 213 to provide the flash functionality. As shown in FIG. 8, the control lever 213 is pivoted in a rearwards direction 233 towards the steering wheel to activate the flash of the full-beam mode of the headlights 202.

As shown in FIG. 8, a switch 231 on the control lever 213 can be controlled to activate a dipped-beam mode of the headlights 202. In other embodiments pivoting of the control lever 213 in a direction different to the direction for the flash of the full-beam mode of the headlights 202, movement of a rotary control or operation of another control may set or operate the dipped-beam mode.

The processor 207 is configured to automate operation of the headlights 202 when the automatic mode is selected (i.e. the rotary function control 235 on the control lever 213 is set to AUTO mode). In particular, the processor 207 is configured to control activation/deactivation of the full-beam mode of the headlights 202 by comparing the measurement signal MS to a control function stored in the system memory 209. In dependence on the results of the comparison, the processor 207 outputs the control signal CS to control operation of the control unit 215 and, therefore, operation of the full-beam mode of the headlights 202.

The control function can comprise an activation threshold and optionally also a deactivation threshold. When the measurement signal MS is greater than or equal to the activation threshold, the processor 207 outputs a first control signal CS1 to activate the control unit 215. When the measurement signal MS is less than the deactivation threshold, the processor 207 outputs a second control signal CS2 to deactivate the control unit 215. The activation threshold can be the same as, or different from the deactivation threshold.

The processor 207 is configured to re-calibrate the control function in dependence on user behaviour. In particular, the processor 207 is configured to monitor user operation of the headlights 202 to determine if the automated control of the headlights 202 is consistent with user-controlled operation of the headlights 202. The processor 207 is configured to identify user interventions to override the automated operation of the headlights 202. The request signal RS is monitored to provide predictors for use in statistical analysis of the user behaviour. Statistical analysis enables re-calibration of the control function to implement a transfer function representing a relationship between the measurement signal MS from the sensor 217 and operation of the headlights 202.

Considering the automated activation of the headlights 202, the processor 207 is configured to determine: (a) if the full-beam mode of the headlights 202 has been activated automatically when it is not required by the user (an undesired activation); and (b) if the full-beam mode of the headlights 202 is in a deactivated state when it is required by the user (a desired activation). The processor 207 interprets a request by the user to perform a flash of the full-beam headlights as an indication that full-beam of the headlights 202 was required but was not provided.

The control lever 213 is used as a first controller to request activation of the headlights 202. When the control lever 213 is moved to a first position 233, a first request signal RS1 is output and interpreted by the processor 207 as an indication that activation of the full-beam mode of the headlights 202 would have been appropriate. When the first request signal RS1 is received, the processor 207 stores the current measurement signal MS output by the sensor 217. The manual displacement of the control lever 213 to request the full-beam headlights within a pre-determined time period causes the processor 207 to recalibrate the activation threshold accordingly.

If the full-beam of the headlights 202 has been activated automatically, the processor 207 interprets a request by the user to deactivate the full-beam mode of the headlights 202 within a predetermined time period as an indication that activation of the full-beam mode of the headlights 202 was inappropriate. In the present embodiment, control lever 213 is used as a second controller to provide an indication that the activation of the full-beam mode of the headlights 202 was inappropriate. When the switch 231 of the control lever 213 is operated, a second request signal RS2 is output. In other embodiments the second request signal RS2 may be output when the control lever 213 is moved to a second position. If the second request signal RS2 is received by the processor 207 within a predetermined time period following activation of the full-beam mode of the headlights 202, the second request signal RS2 is interpreted by the processor 207 as an indication that activation of the full-beam mode of the headlights 202 was not required. When the second request signal RS2 is received, the processor 207 stores the current measurement signal MS output by the sensor 217.

The existing functions of the control lever 213 are interpreted as providing positive or negative feedback on the automated control of the headlights 202. The stored measurement signals MS can subsequently be used to re-calibrate the control function to automate operation of the headlights 202.

The processor 207 uses the first and second request signals RS1, RS2 as predictors for implementing a logistic regression algorithm to re-calibrate the activation threshold. In particular, the processor 207 is configured to increase the activation threshold when the full-beam mode of the headlights 202 is deactivated by the user and to reduce the activation threshold when the full-beam mode of the headlights 202 is activated by the user. The activation threshold can be re-calibrated progressively based on a determined mean activation threshold. Inferential statistical analysis can be used to determine a confidence interval for the mean activation threshold. The processor 207 in the present embodiment is configured to re-calibrate the activation threshold only when the automatic operation is selected. A time rule can be applied to identify a teaching action rather than a one-off event. By way of example, a new user may switch off the automated function and the time rule can be used to differentiate between this and a user-override scenario. The time rule can operate to inhibit re-calibration of the activation threshold. The time period associated with the time rule can be adjusted to provide the desired function. The processor 207 thereby re-calibrates the logistical transfer function between the measurement signal MS and the operation of the headlights 202.

The operation of the processor 207 has been described herein with reference to re-calibrating the activation threshold. The processor 207 can optionally also be configured to re-calibrate a deactivation threshold. Specifically, the processor 207 can be configured to identify user interventions to the automated operation of the headlights 202 to determine: (a) if the full-beam mode of the headlights 202 has been deactivated when it is still required by the user (an undesired deactivation); and (b) if the full-beam mode of the headlights 202 remains in an activated state when it is no longer required by the user (a desired deactivation). The processor 207 monitors the request signal RS from the control lever 213 to monitor user behaviour.

When the full-beam mode of the headlights 202 has been activated by the processor 207 operating in the automatic mode, the request signal RS can be monitored to re-calibrate the deactivation threshold. Statistical analysis is used to re-calibrate the deactivation threshold to implement a transfer function which determines a relationship between the measurement signal MS from the sensor 217 and operation of the headlights 202. If the full-beam mode of the headlights 202 is deactivated automatically and the user re-activates the full-beam mode of the headlights 202 within a predetermined time period, the processor 207 determines that the deactivation of the full-beam mode of the headlights 202 was inappropriate. In the present embodiment, a user request for a flash of the full-beam mode of the headlights 202 within the predetermined time limit is interpreted as a request to re-activate the full-beam mode of the headlights 202. When the control lever 213 is moved to a first position 233, the first request signal RS1 is output and interpreted by the processor 207 as an indication that the deactivation was inappropriate. The processor 207 reads the current measurement signal MS output by the sensor 217 and stores the value in the system memory 209.

The control lever 213 or portion of the control lever 213 is moved to a second position 231 to signal that operation of the full-beam mode of the headlights 202 was inappropriate. When the control lever 213 or portion of the control lever 213 is moved to a second position 231, the second request signal RS2 is output and interpreted by the processor 207 as an indication that the continued operation of the full-beam mode of the headlights 202 was inappropriate. When the second request signal RS2 is received, the processor 207 reads the current measurement signal MS output by the sensor 217 and stores the value in the system memory 209.

Alternatively, or in addition, the deactivation of the headlights 202 by the user, for example by moving the rotary switch 235 to the OFF position, can be interpreted by the processor 207 as an indication that the continued operation of the full-beam mode of the headlights 202 was inappropriate. The second request signal RS2 can be output when the rotary switch 235 is moved to the OFF position. The current measurement signal MS can be stored when the processor 207 determines that the user has de-activated the headlights 202. Again, it will be appreciated that the existing functions of the control lever 213 are interpreted as providing positive or negative feedback on the automated control of the headlights 202.

The processor 207 uses the first and second request signals RS1, RS2 as predictors for implementing a logistic regression algorithm to re-calibrate the deactivation threshold. In particular, the processor 207 is configured to increase the deactivation threshold when the full-beam mode of the headlights 202 is deactivated by the user; and to reduce the deactivation threshold when the full-beam mode of the headlights 202 is re-activated by the user within a predefined time period following an automated deactivation. The deactivation threshold can be re-calibrated progressively based on a determined mean deactivation threshold. Inferential statistical analysis can be used to determine a confidence interval for the determined mean deactivation threshold. The processor 207 thereby re-calibrates the logistical transfer function established between the measurement signal MS and the operation of the headlights 202.

Figure 9:
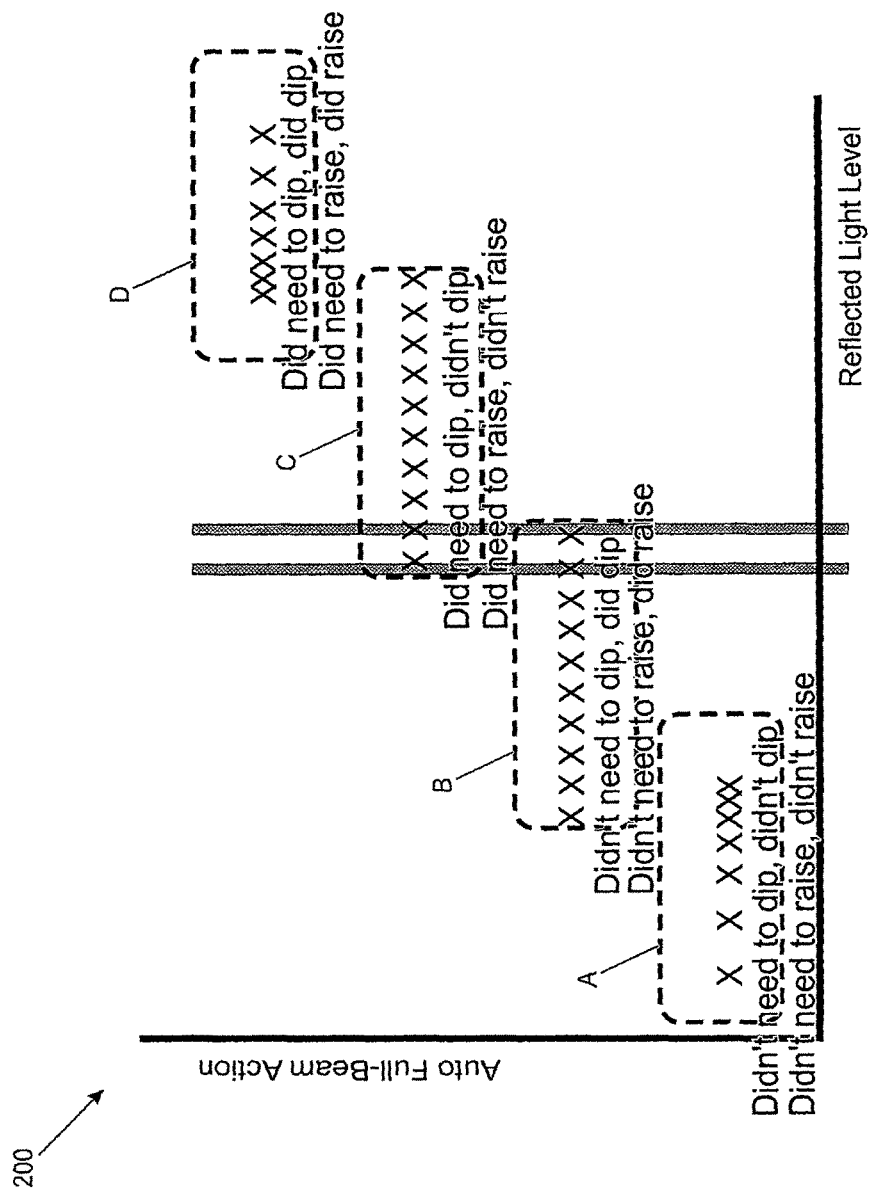
FIG. 9 shows a chart representing activation of the headlight in dependence on a light level detected by a sensor.

The logistic regression technique implemented by the processor 207 is represented in FIG. 9 as a chart 200. The automatic full-beam action or mode of the headlights 202 is shown on the Y-axis and the measurement signal MS output by the sensor 217 is shown on the X-axis. The possible operating scenarios are represented by first, second, third and fourth regions, A-D, namely:

A—Didn't need to dip, didn't dip or didn't need to raise, didn't raise
B—Didn't need to dip, did dip or didn't need to raise, did raise
C—Did need to dip, didn't dip or did need to raise, didn't raise
D—Did need to dip, did dip or did need to raise, did raise The apparatus 201 seeks to calibrate the control function such that the activation and/or deactivation of the headlights 202 is controlled to enter a dipped-mode (dip) or a full-beam mode (raise) only when required. This target operating zone is represented by two vertical lines in FIG. 9 intersecting the overlapping portions of the second and third regions B, C corresponding to the scenarios where a dip or a raise was performed but was not required; and a dip or a raise was not performed but was required. As described herein, the control function is re-calibrated based on user response to the automated activation/deactivation of the headlights 202. Inferential statistical analysis can be used to determine a confidence interval for the mean activation threshold and the mean deactivation threshold. The activation threshold and the deactivation threshold can be re-calibrated incrementally based on the corresponding mean activation and deactivation thresholds.

By re-calibrating the activation threshold, the processor 207 can continuously adjust operation of the headlights 202 to match the preferences of a particular user. The system memory 209 can store the activation threshold and the deactivation threshold. The processor 207 can be coupled to a user identification module to enable the identity of a particular user to be determined. A control function(s) can be stored in the system memory for a plurality of users, for example as part of the seat memory position function, and the appropriate control function accessed by the processor 207 in dependence on the user identified by the user identification module.

It will be appreciated that various changes and modifications can be made to the apparatus 201 described herein without departing from the scope of the present application. The processor 207 can be configured to receive measurement signals from more than one sensor to automate operation of the vehicle system. For example, the measurement signals from different types of sensors can be used to control operation of the vehicle system.

A particular configuration of the control lever 213 for selecting the different operating modes of the headlights 202 has been described herein. It will be appreciated that other configurations can be implemented without departing from the present invention. At least in certain embodiments, the control lever 213 can perform different control functions depending on whether the vehicle system is operating in a manual mode or in an automated mode. The control lever 213 can control the vehicle system directly when operating in a manual mode; and can signal a user override or intervention when operating in the automated mode. Thus, the control lever 213 provides dual functionality, at least in certain embodiments. This dual function can be used for other vehicle systems, such as the windscreen wiper control described herein.

Figure 10:
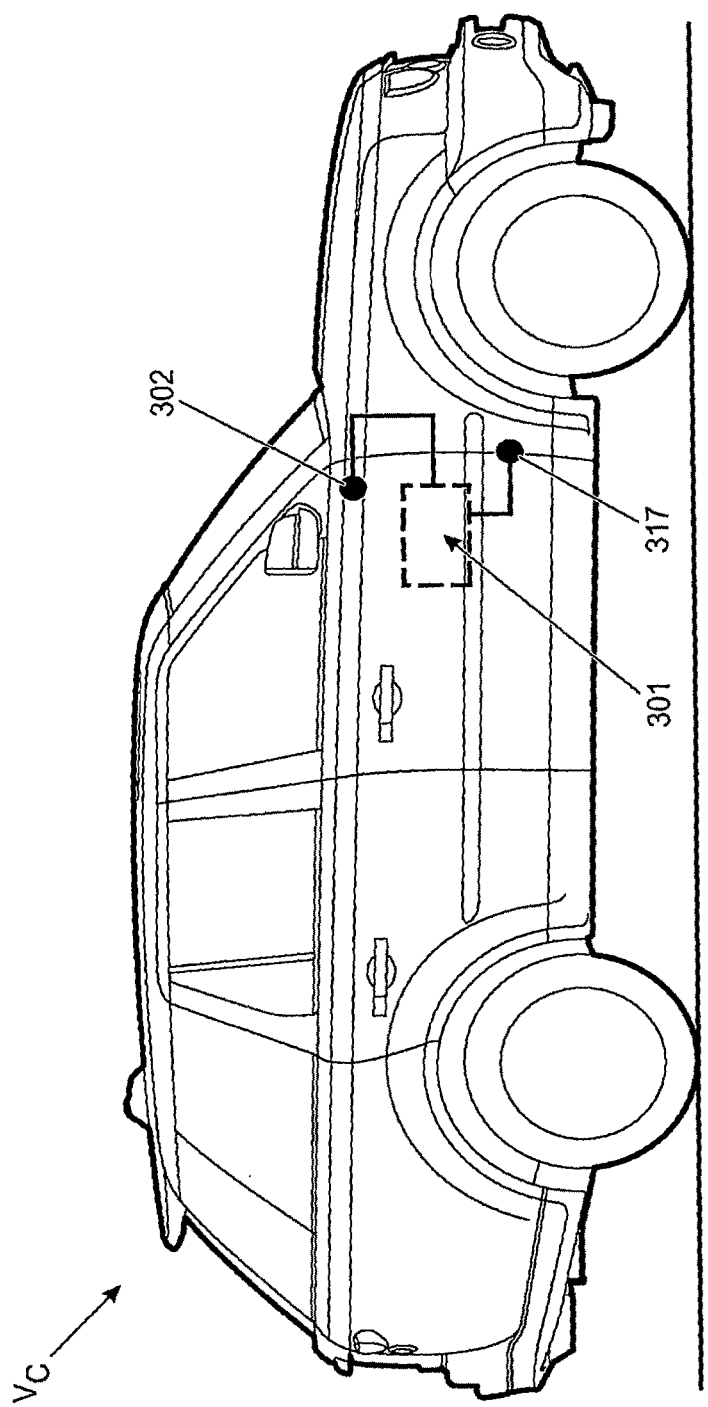
FIG. 10 shows a vehicle incorporating apparatus for controlling operation of the sound generating device in accordance with an embodiment of the present invention.

Apparatus 301 for controlling operation of a vehicle system in accordance with an embodiment of the present invention will now be described with reference to the accompanying FIGS. 10 to 13. The apparatus 301 is installed in an automotive vehicle $V_C$ to control operation of sound generating means or sound generation means, such as a sound generating device 302, as shown in FIG. 10. The sound generating device 302 may be an in-car entertainment system, a satellite navigation system or other arrangement from which sound is emitted. The sound generating device 302 may be used to control the sound level emitted by one or more audio transducers, such as loudspeakers, operatively connected to the sound generating device 302.

Figure 11:
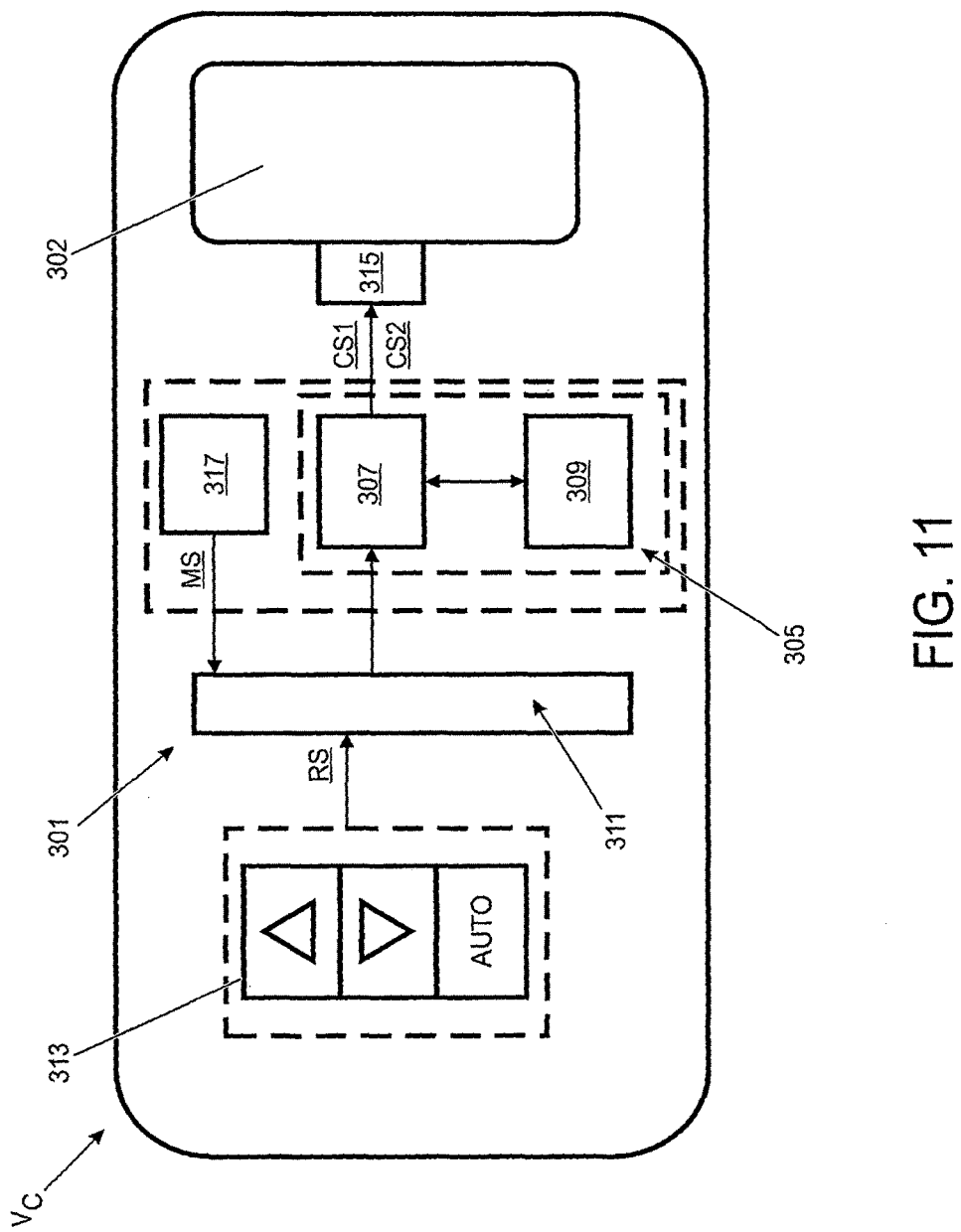
FIG. 11 shows a schematic representation of apparatus shown in FIG. 10.

As shown in FIG. 11, the apparatus 301 comprises a central processing unit 305. The central processing unit 305 comprises a processor 307 and system memory 309. The processor 307 is configured to execute a set of software instructions held in the system memory 309. The central processing unit 305 is connected to a communication bus 311, such as the vehicle CAN bus or FlexRay protocol, for communicating with one or more vehicle systems as described herein.

The central processing unit 305 is connected to control means or a control interface, in the form of a control panel 313 for controlling operation of the sound generating device 302, in particular for operating a sound volume increase and a sound volume decrease for the sound generating device 302. The control panel 313 may be a touchscreen panel, or be formed of discrete switches or controls, or be a combination of both.

Figure 12:
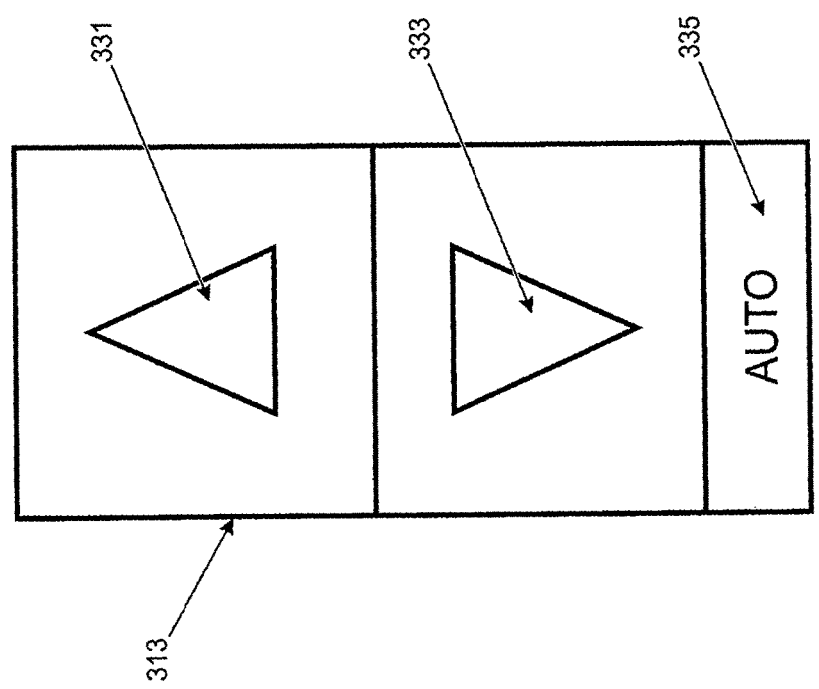
FIG. 12 illustrates control switches for use in conjunction with the apparatus shown in FIG. 11.

As illustrated in FIG. 12, the control panel 313 is operable to provide at least two functions, the first function to operate an increase in sound volume, and a second function to operate a decrease in sound volume. The control panel 313 may be a touchscreen with discrete touch areas corresponding to different functions, or may provide physical actuators in the form of switches associated with each function.

When a first switch 331 or second switch 333 of the control panel 313 is actuated, a corresponding request signal RS is published to the communication bus 311 for access by the processor 307. In dependence on the request signal RS, the processor 307 outputs a control signal CS to control operation of a control unit 315 adapted to control the operation of the sound generating device 302. In other embodiments, rotary controls or other controls may alternatively, or additionally, be provided for sound generating device 302 control, in particular, sound volume control. It will be understood that the operation of specific control panels 313 or portions of control panels 313 for the control of the sound generating device 302 may vary from vehicle to vehicle. Additional or alternative controls may be provided on another component of the vehicle, such as the steering wheel or a vehicle centre console, to provide for the control of functions of the sound generating device 302.

It is to be understood that embodiments of the invention require two outputs from the control panel 313, or other components of the vehicle, for the user to provide an override of the automated operation of the sound generating device 302, the functions of which will be described below.

A sensor 317 is provided to detect a background noise level. The sensor 317 in the present embodiment is an audio transducer, such as a microphone, fitted to the vehicle 301. The sensor 317 may be provided internal or external to the vehicle, and may for example be in a cockpit of the vehicle. The sensor 317 may detect a level of background noise which would be detected by a user of the vehicle, and in particular a user of the sound generating device 302. However, other sensors or combination of sensors, such as audio sensors, vibration sensors, vehicle speed sensors and/or vehicle engine speed sensors could be implemented in other embodiments to detect or infer a background noise level. A measurement signal MS is output continuously by the sensor 317 to the communication bus 311 to indicate the amount of background noise detected by the sensor 317. The processor 307 is operable in an automatic mode to automate operation of the sound generating device 302 in dependence on the measurement signal MS.

The automatic mode may be selected by the user selecting an automated mode using the control panel 313. In particular a switch 335 may be actuated to select an automatic mode. The switch 335 may alternatively be provided on a separate area of a touchscreen control panel 313 or switched control panel 313, to be actuated to select an automatic mode. When operating in the automatic mode, the processor 307 controls the activation and deactivation of the increase in the sound volume of the sound generating device 302.

The sensitivity of the sensor 317 can optionally be adjusted manually by rotating a rotary selector (not shown), sliding a sensitivity selector (not shown), or by other means disposed on the control panel 313, or elsewhere. The processor 307 could optionally be configured to monitor the selected sensitivity of the sensor 317 and calibrate the activation threshold based on the user-selected sensitivity setting. Alternatively, the sensitivity selector could be used to control operating parameters of the sound generating device 302, which could be used by the processor 307 to control operation of the sound generating device 302 in the automatic mode. The sensitivity selector could be omitted in certain embodiments.

The control panel 313 is operable to control an increase in the sound volume of the sound generating device 302 using a first switch 331 or first area 331 of the control panel 313, as shown in FIG. 12. The first switch 331 of the control panel 313 is pressed by the user in order to activate an increase in the sound volume for the sound generating device 302.

As shown in FIG. 12, the second switch 333 or second area 333 of the control panel 313 is pressed or touched by the user to activate a decrease in the sound volume for the sound generating device 302.

The processor 307 is configured to automate operation of the sound generating device 302 when the automatic mode is selected (i.e. by an auto volume function being set using switch 335 of the control panel 313). In particular, the processor 307 is configured to control activation/deactivation of the increase in sound volume of the sound generating device 302 by comparing the measurement signal MS to a control function stored in the system memory 309. In dependence on the results of the comparison, the processor 307 outputs the control signal CS to control operation of the control unit 315 and, therefore, operation of the increase in the sound volume of the sound generating device 302.

The control function can comprise an activation threshold and optionally also a deactivation threshold. When the measurement signal MS is greater than or equal to the activation threshold, the processor 307 outputs a first control signal CS1 to activate the control unit 315. When the measurement signal MS is less than the deactivation threshold, the processor 307 outputs a second control signal CS2 to deactivate the control unit 315. The activation threshold can be the same as, or different from the deactivation threshold.

The processor 307 is configured to re-calibrate the control function in dependence on user behaviour. In particular, the processor 307 is configured to monitor user operation of the sound generating device 302 to determine if the automated control of the sound generating device 302 is consistent with user-controlled operation of the sound generating device 302. The processor 307 is configured to identify user interventions to override the automated operation of the sound generating device 302. The request signal RS is monitored to provide predictors for use in statistical analysis of the user behaviour. Statistical analysis enables re-calibration of the control function to implement a transfer function representing a relationship between the measurement signal MS from the sensor 317 and operation of the sound generating device 302.

Considering the automated activation of the sound generating device 302, the processor 307 is configured to determine: (a) if the increase in the sound volume of the sound generating device 302 has been activated automatically when it is not required by the user (an undesired activation); and (b) if the increase in the sound volume of the sound generating device 302 is in a deactivated state when it is required by the user (a desired activation). The processor 307 interprets a request by the user to perform an increase in the sound volume as an indication that an increase in the sound volume of the sound generating device 302 was required but was not provided.

The control panel 313 is used as a first controller to request activation of the sound generating device 302. When the first switch 331 of the control panel 313 is actuated, a first request signal RS1 is output and interpreted by the processor 307 as an indication that activation of the increase in the sound volume of the sound generating device 302 would have been appropriate. When the first request signal RS1 is received, the processor 307 stores the current measurement signal MS output by the sensor 317. The manual actuation of the first switch 331 of the control panel 313 to request an increase in the sound volume of the sound generating device 302 within a pre-determined time period causes the processor 307 to recalibrate the activation threshold accordingly.

If the increase in the sound volume of the sound generating device 302 has been activated automatically, the processor 307 interprets a request by the user to deactivate the increase in the sound volume of the sound generating device 302 within a predetermined time period as an indication that activation of the increase in the sound volume of the sound generating device 302 was inappropriate. In the present embodiment, the second switch 333 of the control panel 313 is used as a second controller to provide an indication that the activation of the increase in the sound volume of the sound generating device 302 was inappropriate. When the switch 333 of the control panel 313 is operated, a second request signal RS2 is output. If the second request signal RS2 is received by the processor 307 within a predetermined time period following activation of the increase in the sound volume of the sound generating device 302, the second request signal RS2 is interpreted by the processor 307 as an indication that activation of the increase in the sound volume of the sound generating device 302 was not required. When the second request signal RS2 is received, the processor 307 stores the current measurement signal MS output by the sensor 317.

The existing functions of the control panel 313 are interpreted as providing positive or negative feedback on the automated control of the sound generating device 302. The stored measurement signals MS can subsequently be used to re-calibrate the control function to automate operation of the sound generating device 302.

The processor 307 uses the first and second request signals RS1, RS2 as predictors for implementing a logistic regression algorithm to re-calibrate the activation threshold. In particular, the processor 307 is configured to increase the activation threshold when the increase in the sound volume of the sound generating device 302 is deactivated by the user and to reduce the activation threshold when the increase in the sound volume of the sound generating device 302 is activated by the user. The activation threshold can be re-calibrated progressively based on a determined mean activation threshold. Inferential statistical analysis can be used to determine a confidence interval for the mean activation threshold. The processor 307 in the present embodiment is configured to re-calibrate the activation threshold only when the automatic operation is selected. A time rule can be applied to identify a teaching action rather than a one-off event. By way of example, a new user may switch off the automated function and the time rule can be used to differentiate between this and a user-override scenario. The time rule can operate to inhibit re-calibration of the activation threshold. The time period associated with the time rule can be adjusted to provide the desired function. The processor 307 thereby re-calibrates the logistical transfer function between the measurement signal MS and the operation of the sound generating device 302.

The operation of the processor 307 has been described herein with reference to re-calibrating the activation threshold. The processor 307 can optionally also be configured to re-calibrate a deactivation threshold. Specifically, the processor 307 can be configured to identify user interventions to the automated operation of the sound generating device 302 to determine: (a) if the increase in the sound volume of the sound generating device 302 has been deactivated when it is still required by the user (an undesired deactivation); and (b) if the increase in the sound volume of the sound generating device 302 remains in an activated state when it is no longer required by the user (a desired deactivation). The processor 307 monitors the request signal RS from the control panel 313 to monitor user behaviour.

When the increase in the sound volume of the sound generating device 302 has been activated by the processor 307 operating in the automatic mode, the request signal RS can be monitored to re-calibrate the deactivation threshold. Statistical analysis is used to re-calibrate the deactivation threshold to implement a transfer function which determines a relationship between the measurement signal MS from the sensor 317 and operation of the sound generating device 302. If the increase in the sound volume of the sound generating device 302 is deactivated automatically and the user re-activates the increase in the sound volume of the sound generating device 302 within a predetermined time period, the processor 307 determines that the deactivation of the increase in the sound volume of the sound generating device 302 was inappropriate. In the present embodiment, a user request for an increase in the sound volume of the sound generating device 302 within the predetermined time limit is interpreted as a request to re-activate the increase in the sound volume of the sound generating device 302. When the first switch 331 of the control panel 313 is actuated, the first request signal RS1 is output and interpreted by the processor 307 as an indication that the deactivation was inappropriate. The processor 307 reads the current measurement signal MS output by the sensor 317 and stores the value in the system memory 309.

The second switch 333 of the control panel 313 is actuated to signal that operation of the increase in the sound volume of the sound generating device 302 was inappropriate. When the second switch 333 of the control panel 313 is actuated, the second request signal RS2 is output and interpreted by the processor 307 as an indication that the continued operation of the increase in the sound volume of the sound generating device 302 was inappropriate. When the second request signal RS2 is received, the processor 307 reads the current measurement signal MS output by the sensor 317 and stores the value in the system memory 309.

Alternatively, or in addition, the deactivation of the sound generating device 302 by the user, can be interpreted by the processor 307 as an indication that the continued operation of the increase in the sound volume of the sound generating device 302 was inappropriate. The current measurement signal MS can be stored when the processor 307 determines that the user has de-activated the sound generating device 302. Again, it will be appreciated that the existing functions of the control panel 313 are interpreted as providing positive or negative feedback on the automated control of the sound generating device 302.

The processor 307 uses the first and second request signals RS1, RS2 as predictors for implementing a logistic regression algorithm to re-calibrate the deactivation threshold. In particular, the processor 307 is configured to increase the deactivation threshold when the increase in the sound volume of the sound generating device 302 is deactivated by the user; and to reduce the deactivation threshold when the increase in the sound volume of the sound generating device 302 re-activated by the user within a predefined time period following an automated deactivation. The deactivation threshold can be re-calibrated progressively based on a determined mean deactivation threshold. Inferential statistical analysis can be used to determine a confidence interval for the determined mean deactivation threshold. The processor 307 thereby re-calibrates the logistical transfer function established between the measurement signal MS and the operation of the sound generating device 302.

Figure 13:
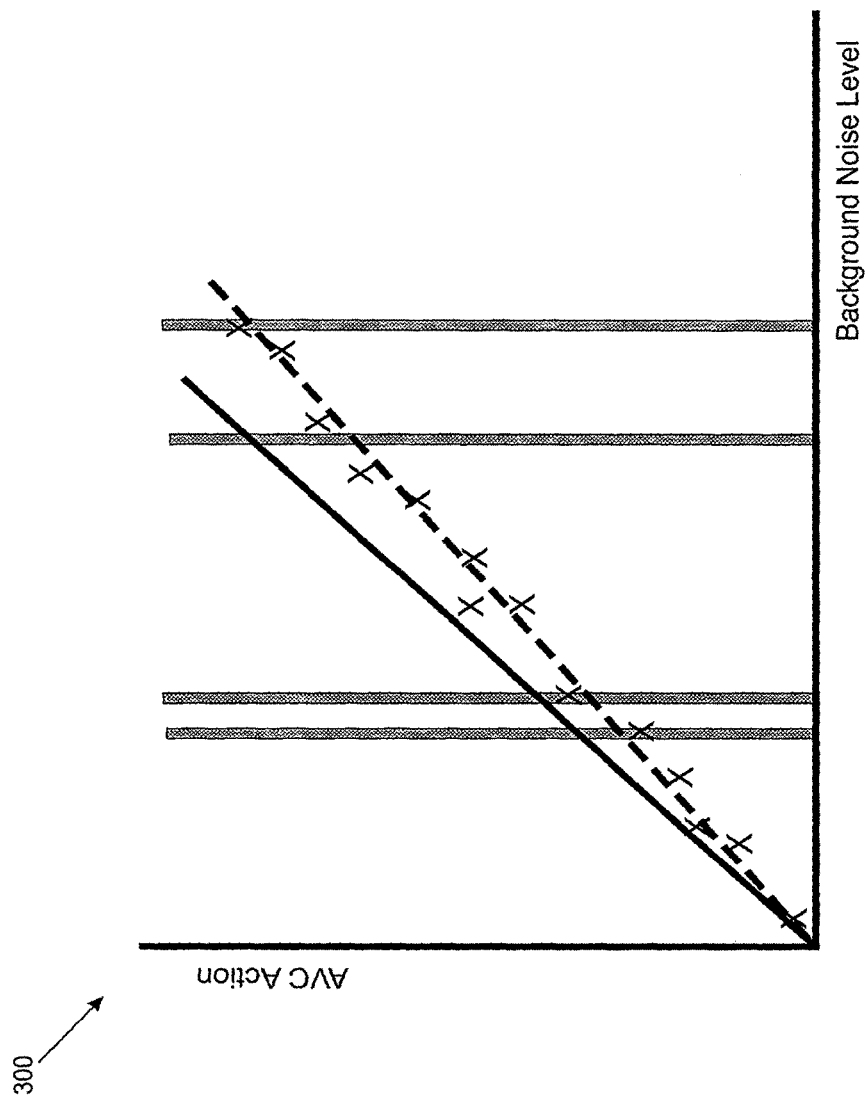
FIG. 13 shows a chart representing activation of the volume control in dependence on a background noise level detected by a sensor.

The logistic regression technique implemented by the processor 307 is represented in FIG. 13 as a chart 300. The automatic volume control (AVC) of the sound generating device 302 is shown on the Y-axis and the measurement signal MS output by the sensor 317 is shown on the X-axis. Driver input at different points along the AVC regression can be used to recalibrate a transfer function between background noise level and the auto volume control.

The apparatus 301 seeks to calibrate the control function such that the activation and/or deactivation of the sound generating device 302 is controlled to perform an increase or a decrease in the sound volume only when required. As described herein, the control function is re-calibrated based on user response to the automated activation/deactivation of the sound generating device 302. Inferential statistical analysis can be used to determine a confidence interval for the mean activation threshold and the mean deactivation threshold. The activation threshold and the deactivation threshold can be re-calibrated incrementally based on the corresponding mean activation and deactivation thresholds.

By re-calibrating the activation threshold, the processor 307 can continuously adjust operation of the sound generating device 302 to match the preferences of a particular user. The system memory 309 can store the activation threshold and the deactivation threshold. The processor 307 can be coupled to a user identification module to enable the identity of a particular user to be determined. A control function(s) can be stored in the system memory for a plurality of users, for example as part of the seat memory position function, and the appropriate control function accessed by the processor 307 in dependence on the user identified by the user identification module.

It will be appreciated that various changes and modifications can be made to the apparatus 301 described herein without departing from the scope of the present application. The processor 307 can be configured to receive measurement signals from more than one sensor to automate operation of the vehicle system. For example, the measurement signals from different types of sensors can be used to control operation of the vehicle system.

A particular configuration of the control panel 313 for selecting the different operating modes of the sound generating device 302 has been described herein. It will be appreciated that other configurations can be implemented without departing from the present invention. At least in certain embodiments, the control panel 313 can perform different control functions depending on whether the vehicle system is operating in a manual mode or in an automated mode. The control panel 313 can control the vehicle system directly when operating in a manual mode; and can signal a user override or intervention when operating in the automated mode. Thus, the control panel 313 provides dual functionality, at least in certain embodiments.

Further aspects of the present invention are set out in the following numbered paragraphs:

1. Apparatus for controlling operation of a vehicle system, the apparatus comprising a processor operable in an automatic mode to output a control signal to automate operation of the vehicle system; wherein the processor is configured to:
   receive a measurement signal from a sensor associated with the vehicle system;
   output the control signal in dependence on a comparison of the measurement signal to a control function;
   detect a user override of the automated operation of the vehicle system; and
   re-calibrate the control function in dependence on the detected user override of the vehicle system.

2. Apparatus as described in paragraph 1, wherein re-calibrating the control function comprises applying a regression technique.

3. Apparatus as described in paragraph 2, wherein the regression technique is a logistic regression technique.

4. Apparatus as described in paragraph 1, wherein the control function comprises an activation threshold and the control signal is an activation signal configured to activate the vehicle system.

5. Apparatus as described in paragraph 4, wherein the processor is configured to re-calibrate the activation threshold by increasing the activation threshold when the user override comprises deactivating the vehicle system following output of the activation signal.

6. Apparatus as described in paragraph 4, wherein the processor is configured to re-calibrate the control function by reducing the activation threshold when the override comprises activating the vehicle system.

7. Apparatus as described in paragraph 1, wherein the control function comprises a deactivation threshold and the control signal is a deactivation signal configured to deactivate the vehicle system.

8. Apparatus as described in paragraph 7, wherein the processor is configured to re-calibrate the deactivation threshold by decreasing the deactivation threshold when the user override comprises re-activating the vehicle system.

9. Apparatus as described in paragraph 7, wherein the processor is configured to re-calibrate the deactivation threshold by increasing the deactivation threshold when the user override comprises deactivating the vehicle system.

10. Apparatus as described in paragraph 1, wherein the processor is configured to detect a user override by monitoring operation of a control interface coupled to the vehicle system.

11. Apparatus as described in paragraph 10, wherein the control interface comprises a user-operated switch to activate and/or deactivate the vehicle system.

12. Apparatus as described in paragraph 1, wherein the vehicle system is a windshield wiper, the processor being configured to receive the measurement signal from a rain sensor.

13. Apparatus as described in paragraph 12, wherein the processor is configured to receive a first request signal from a first controller to activate the windshield wiper, and a second request signal from a second controller to deactivate the windshield wiper.

14. Apparatus as described in paragraph 13, wherein the control function comprises an activation threshold for activating the windshield wiper; and, when operating in the automatic mode and the windshield wiper has been activated, the processor is configured to reduce the activation threshold in dependence on the first request signal, and to increase the activation threshold in dependence on the second request signal.

15. Apparatus as described in paragraph 13, wherein the control function comprises a deactivation threshold for deactivating the windshield wiper; and, when operating in the automatic mode and the windshield wiper has been deactivated, the processor is configured to reduce the activation threshold in dependence on the first request signal, and to increase the activation threshold in dependence on the second request signal.

16. Apparatus as described in paragraph 1, wherein the vehicle system is a headlight operable in a full-beam mode in dependence on the control signal, the processor being configured to receive the measurement signal from a sensor adapted to detect an oncoming vehicle.

17. Apparatus as described in paragraph 16, wherein the processor is configured to receive a first request signal from a first controller to activate the full-beam mode and a second request signal from a second controller to deactivate the full-beam mode.

18. An apparatus as described in paragraph 17, wherein the control function comprises an activation threshold for activating the full-beam mode; and, when operating in the automatic mode and the full-beam mode has been activated, the processor is configured to reduce the activation threshold in dependence on the first request signal, and to increase the activation threshold in dependence on the second request signal.

19. An apparatus as described in paragraph 17, wherein the control function comprises a deactivation threshold for deactivating the full-beam mode; and, when operating in the automatic mode and the full-beam mode has been deactivated, the processor is configured to reduce the activation threshold in dependence on the first request signal, and to increase the activation threshold in dependence on the second request signal.

20. An apparatus as described in paragraph 1, wherein the vehicle system is a sound generating device operable to increase a sound volume in dependence on the control signal, the processor being configured to receive the measurement signal from a sensor adapted to detect background noise.

21. An apparatus as described in paragraph 20, wherein the processor is configured to receive a first request signal from a first controller to activate the increase in the sound volume and a second request signal from a second controller to deactivate the increase in the sound volume.

22. An apparatus as described in paragraph 21, wherein the control function comprises an activation threshold for activating the increase in the sound volume; and, when operating in the automatic mode and the increase in the sound volume has been activated, the processor is configured to reduce the activation threshold in dependence on the first request signal, and to increase the activation threshold in dependence on the second request signal.

23. An apparatus as described in paragraph 21, wherein the control function comprises a deactivation threshold for deactivating the increase in the sound volume; and, when operating in the automatic mode and the increase in the sound volume has been deactivated, the processor is configured to reduce the activation threshold in dependence on the first request signal, and to increase the activation threshold in dependence on the second request signal.

24. Apparatus as described in paragraph 1, wherein the control function comprises a defined value or a defined range.

25. Apparatus as described in paragraph 1, wherein the processor is configured to re-define the control signal in dependence on the detected user override.

26. A vehicle comprising apparatus as described in paragraph 1.

27. A method of controlling operation of a vehicle system, the method comprising:
receiving a measurement signal from a sensor associated with the vehicle system;
outputting a control signal to automate operation of the vehicle system, the control signal being output in dependence on a comparison of the measurement signal to a control function;
detecting a user override of the automated operation of the vehicle system; and
re-calibrating the control function in dependence on the user override of the vehicle system.

28. A method as described in paragraph 27, wherein re-calibrating the control function comprises applying a regression technique.

29. A method as described in paragraph 28, wherein the regression technique is a logistic regression technique.

30. A method as described in paragraph 27, wherein the control function comprises an activation threshold and the control signal is an activation signal configured to activate the vehicle system.

31. A method as described in paragraph 30, wherein re-calibrating the activation threshold comprises increasing the activation threshold when the user override comprises deactivating the vehicle system following output of the activation signal.

32. A method as described in paragraph 30 comprising re-calibrating the control function by reducing the activation threshold when the user override comprises activating the vehicle system.

33. A method as described in paragraph 27, wherein the control function comprises a deactivation threshold and the control signal is a deactivation signal configured to deactivate the vehicle system.

34. A method as described in paragraph 33 comprising re-calibrating the deactivation threshold by decreasing the deactivation threshold when the user override comprises re-activating the vehicle system.

35. A method as described in paragraph 33 comprising re-calibrating the deactivation threshold by increasing the deactivation threshold when the user override comprises deactivating the vehicle system.

36. A method as described in paragraph 27 comprising detecting a user override by monitoring operation of a control interface coupled to the vehicle system.

37. A method as described in paragraph 36, wherein the control interface is monitored to detect activation and/or deactivation of the vehicle system.

38. A method as described in paragraph 27, wherein the vehicle system is a windshield wiper; the method receiving the measurement signal from a rain sensor, and controlling operation of the windshield wiper in dependence on the measurement signal.

39. A method as described in paragraph 38 comprising receiving a first request signal from a first controller to activate the windshield wiper, and receiving a second request signal from a second controller to deactivate the windshield wiper.

40. A method as described in paragraph 39, wherein the control function comprises an activation threshold for activating the windshield wiper; and, when the windshield wiper has been activated automatically, the method comprises reducing the activation threshold in dependence on the first request signal, and increasing the activation threshold in dependence on the second request signal.

41. A method as described in paragraph 39, wherein the control function comprises a deactivation threshold for deactivating the windshield wiper; and, when the windshield wiper has been deactivated automatically, the method comprises reducing the activation threshold in dependence on the first request signal, and increasing the activation threshold in dependence on the second request signal.

42. A method as described in paragraph 27, wherein the vehicle system is a headlight operable in a full-beam mode; the method comprising receiving the measurement signal from a sensor adapted to detect an oncoming vehicle, and controlling operation of the headlight to activate or deactivate the full-beam mode in dependence on the measurement signal.

43. A method as described in paragraph 42 comprising receiving a first request signal from a first controller to activate the full-beam mode and a second request signal from a second controller to activate a dipped-beam mode.

44. A method as described in paragraph 43, wherein the control function comprises an activation threshold for activating the full-beam mode; and, when the full-beam mode has been activated automatically, the method comprises reducing the activation threshold in dependence on the first request signal, and increasing the activation threshold in dependence on the second request signal.

45. A method as described in paragraph 43, wherein the control function comprises a deactivation threshold for deactivating the full-beam mode; and, when the full-beam mode has been deactivated automatically, the method comprises reducing the activation threshold in dependence on the first request signal, and increasing the activation threshold in dependence on the second request signal.

46. A method as described in paragraph 27, wherein the vehicle system is a sound generating device operable to increase a sound volume; the method comprising receiving the measurement signal from a sensor adapted to detect background noise, and controlling operation of the sound generating device to activate or deactivate an increase in the sound volume in dependence on the measurement signal.

47. A method as described in paragraph 46 comprising receiving a first request signal from a first controller to activate an increase in the sound volume, and receiving a second request signal from a second controller to deactivate the increase in the sound volume.

48. A method as described in paragraph 47, wherein the control function comprises an activation threshold for activating the increase in the sound volume; and, when the increase in the sound volume has been activated automatically, the method comprises reducing the activation threshold in dependence on the first request signal, and increasing the activation threshold in dependence on the second request signal.

49. A method as described in paragraph 47, wherein the control function comprises a deactivation threshold for deactivating the increase in the sound volume; and, when the increase in the sound volume has been deactivated automatically, the method comprises reducing the activation threshold in dependence on the first request signal, and increasing the activation threshold in dependence on the second request signal.

50. A method as described in paragraph 27, wherein the control function comprises a defined value or a defined range.

51. A method as described in paragraph 27 comprising re-defining the control signal in dependence on the detected user override.

52. A processor configured to execute a set of instructions held in system memory to perform the method described in paragraph 27.

53. A set of instructions which, when executed by a processor, cause the processor to perform the method described in paragraph 27.

The invention claimed is:

1. An apparatus for controlling operation of a vehicle system, wherein the vehicle system is a windshield wiper, the apparatus comprising:
a processor configured to:
in an automatic mode, output a control signal to automate operation of the vehicle system;
receive a measurement signal from a sensor associated with the vehicle system;
output the control signal in dependence on a comparison of the measurement signal to a control function;
detect a user override of the automated operation of the vehicle system; and
re-calibrate the control function in dependence on the detected user override of the vehicle system, wherein re-calibrating the control function comprises applying a regression technique correlating data from a plurality of user overrides to the measurement signal received from the sensor.

2. The apparatus as claimed in claim 1, wherein the regression technique is a logistic regression technique.

3. The apparatus as claimed in claim 1, wherein the control function comprises an activation threshold and the control signal is an activation signal configured to activate the vehicle system.

4. The apparatus as claimed in claim 3, wherein the processor is configured to re-calibrate the activation threshold by increasing the activation threshold when the user override comprises deactivating the vehicle system following output of the activation signal.

5. The apparatus as claimed in claim 3, wherein the processor is configured to re-calibrate the control function by reducing the activation threshold when the user override comprises activating the vehicle system.

6. The apparatus as claimed in claim 1, wherein the control function comprises a deactivation threshold and the control signal is a deactivation signal configured to deactivate the vehicle system.

7. The apparatus as claimed in claim 6, wherein the processor is configured to re-calibrate the deactivation threshold by decreasing the deactivation threshold when the user override comprises re-activating the vehicle system.

8. The apparatus as claimed in claim 6, wherein the processor is configured to re-calibrate the deactivation threshold by increasing the deactivation threshold when the user override comprises deactivating the vehicle system.

9. The apparatus as claimed in claim 1, wherein the processor is configured to detect a user override by monitoring operation of a control interface coupled to the vehicle system, wherein the control interface comprises a user-operated switch to activate and/or deactivate the vehicle system.

10. The apparatus as claimed in claim 1, wherein the sensor comprises a rain sensor.

11. The apparatus as claimed in claim 10, wherein the processor is configured to receive a first request signal from a first controller to activate the windshield wiper, and a second request signal from a second controller to deactivate the windshield wiper.

12. The apparatus as claimed in claim 11,
wherein the control function comprises an activation threshold for activating the windshield wiper; and
wherein, when operating in the automatic mode and the windshield wiper has been activated, the processor is configured to reduce the activation threshold in dependence on the first request signal and increase the activation threshold in dependence on the second request signal.

13. The apparatus as claimed in claim 11, wherein the control function comprises a deactivation threshold for deactivating the windshield wiper; and wherein, when operating in the automatic mode and the windshield wiper has been deactivated, the processor is configured to reduce the activation threshold in dependence on the first request signal and increase the activation threshold in dependence on the second request signal.

14. A vehicle comprising the apparatus as claimed in claim 1.

15. A method of controlling operation of a vehicle system, wherein the vehicle system is a windshield wiper, the method comprising:

receiving a measurement signal from a sensor associated with the vehicle system;

outputting a control signal to automate operation of the vehicle system, the control signal being output in dependence on a comparison of the measurement signal to a control function;

detecting a user override of the automated operation of the vehicle system; and re-calibrating the control function in dependence on the user override of the vehicle system, wherein re-calibrating the control function comprises applying a regression technique correlating data from a plurality of user overrides to the measurement signal received from the sensor.

16. A processor configured to execute a set of instructions held in system memory to perform the method of claim 15.

17. A vehicle comprising the processor as claimed in claim 16.

18. A computer program product, comprising a non-transitory computer readable storage medium having encoded thereon instructions which, when executed by a processor, cause the processor to perform the method of claim 15.

19. A vehicle, comprising the computer program product of claim 18.

* * * * *